(12) United States Patent
Kubota

(10) Patent No.: US 11,778,120 B2
(45) Date of Patent: Oct. 3, 2023

(54) METHOD, SYSTEM, AND IMAGE FORMING APPARATUS

(71) Applicant: CANON KABUSHIKI KAISHA, Tokyo (JP)

(72) Inventor: Tomohide Kubota, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/697,787

(22) Filed: Mar. 17, 2022

(65) Prior Publication Data
US 2022/0303428 A1 Sep. 22, 2022

(30) Foreign Application Priority Data

Mar. 19, 2021 (JP) .................. 2021-045908
Sep. 30, 2021 (JP) .................. 2021-160996

(51) Int. Cl.
| | |
|---|---|
| G06K 15/00 | (2006.01) |
| H04N 1/32 | (2006.01) |
| H04N 1/44 | (2006.01) |
| H04N 1/00 | (2006.01) |

(52) U.S. Cl.
CPC ..... *H04N 1/32106* (2013.01); *H04N 1/00076* (2013.01); *H04N 1/00209* (2013.01); *H04N 1/00689* (2013.01); *H04N 1/4413* (2013.01); *H04N 2201/0074* (2013.01);
(Continued)

(58) Field of Classification Search
CPC ........... H04N 1/32106; H04N 1/00076; H04N 1/00209; H04N 1/00689; H04N 1/4413; H04N 2201/0074; H04N 2201/3269; H04N 2201/3273; H04N 2201/3278; H04N 2201/3281
See application file for complete search history.

(56) References Cited

U.S. PATENT DOCUMENTS

| | | | |
|---|---|---|---|
| 2008/0068642 A1* | 3/2008 | Takahashi | G06F 21/608 358/1.15 |
| 2013/0021639 A1 | 1/2013 | Suzuki | |

(Continued)

FOREIGN PATENT DOCUMENTS

| | | |
|---|---|---|
| JP | 2015207875 A | 11/2015 |
| JP | 2020145493 A | 9/2020 |
| WO | 2020/105288 A1 | 5/2020 |

*Primary Examiner* — Moustapha Diaby
(74) *Attorney, Agent, or Firm* — Canon U.S.A., Inc. IP Division

(57) ABSTRACT

A method performed by a data processing apparatus and an image forming apparatus includes transmitting, by the data processing apparatus, an execution instruction for a job to the image forming apparatus, generating, by the image forming apparatus, an authentication code corresponding to the transmitted execution instruction and displaying the authentication code or information representing the encrypted authentication code on a display unit of the image forming apparatus, transmitting, by the data processing apparatus, an authentication code to the image forming apparatus, and executing, by the image forming apparatus, a job corresponding to the transmitted execution instruction in a case where a predetermined condition is determined to be satisfied based on the transmitted authentication code and the generated authentication code.

18 Claims, 15 Drawing Sheets

(52) U.S. Cl.
CPC ............... *H04N 2201/3269* (2013.01); *H04N 2201/3273* (2013.01); *H04N 2201/3278* (2013.01)

(56) References Cited

U.S. PATENT DOCUMENTS

| | | | |
|---|---|---|---|
| 2015/0215481 A1* | 7/2015 | Faust | H04N 1/32122 358/1.13 |
| 2017/0142767 A1* | 5/2017 | Furubayashi | H04W 4/80 |
| 2018/0260175 A1* | 9/2018 | Watanabe | G06F 3/1238 |
| 2018/0278766 A1* | 9/2018 | Sawa | H04N 1/00442 |
| 2020/0106922 A1 | 4/2020 | Moroi | |

* cited by examiner

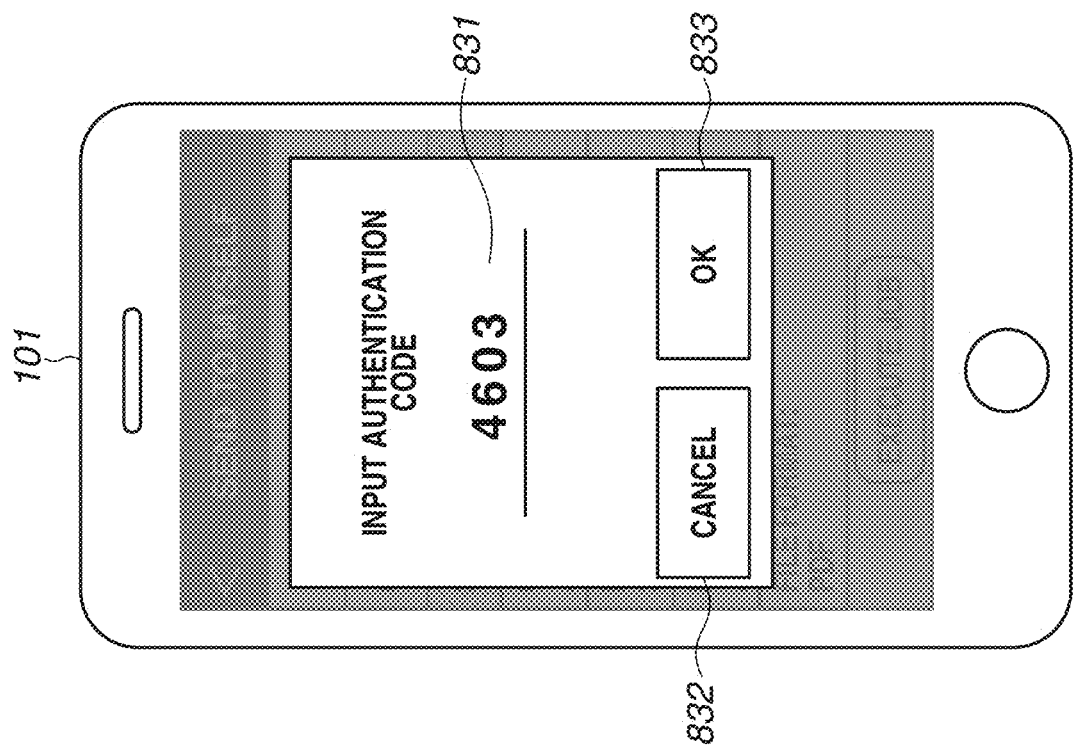
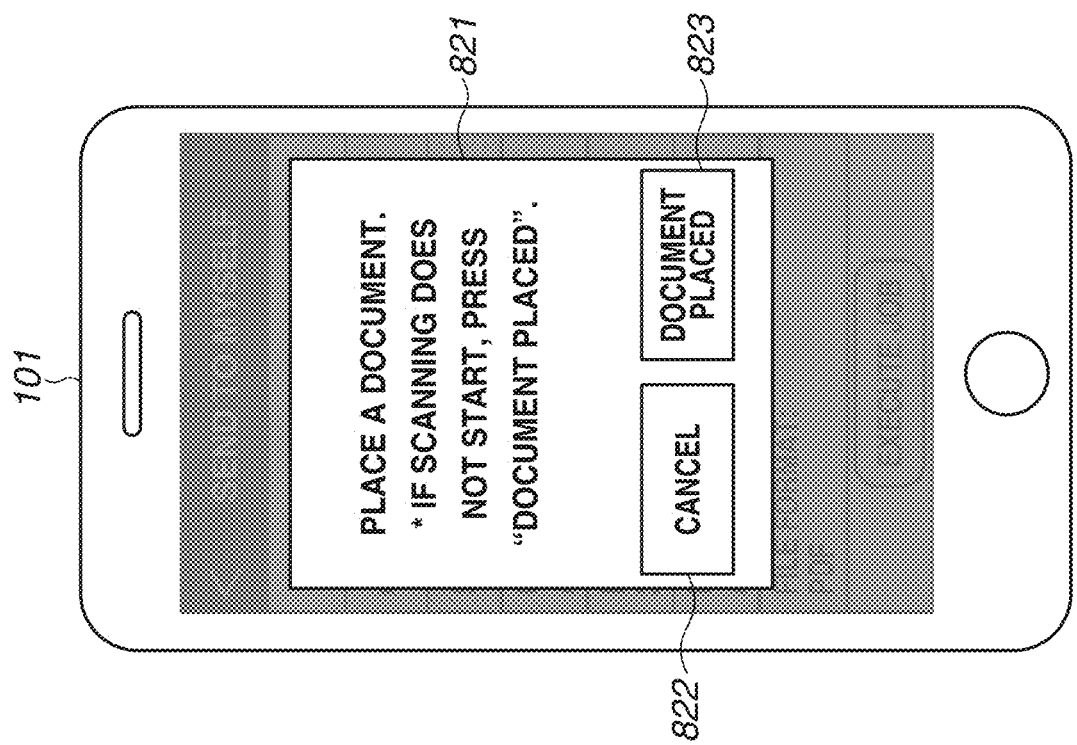

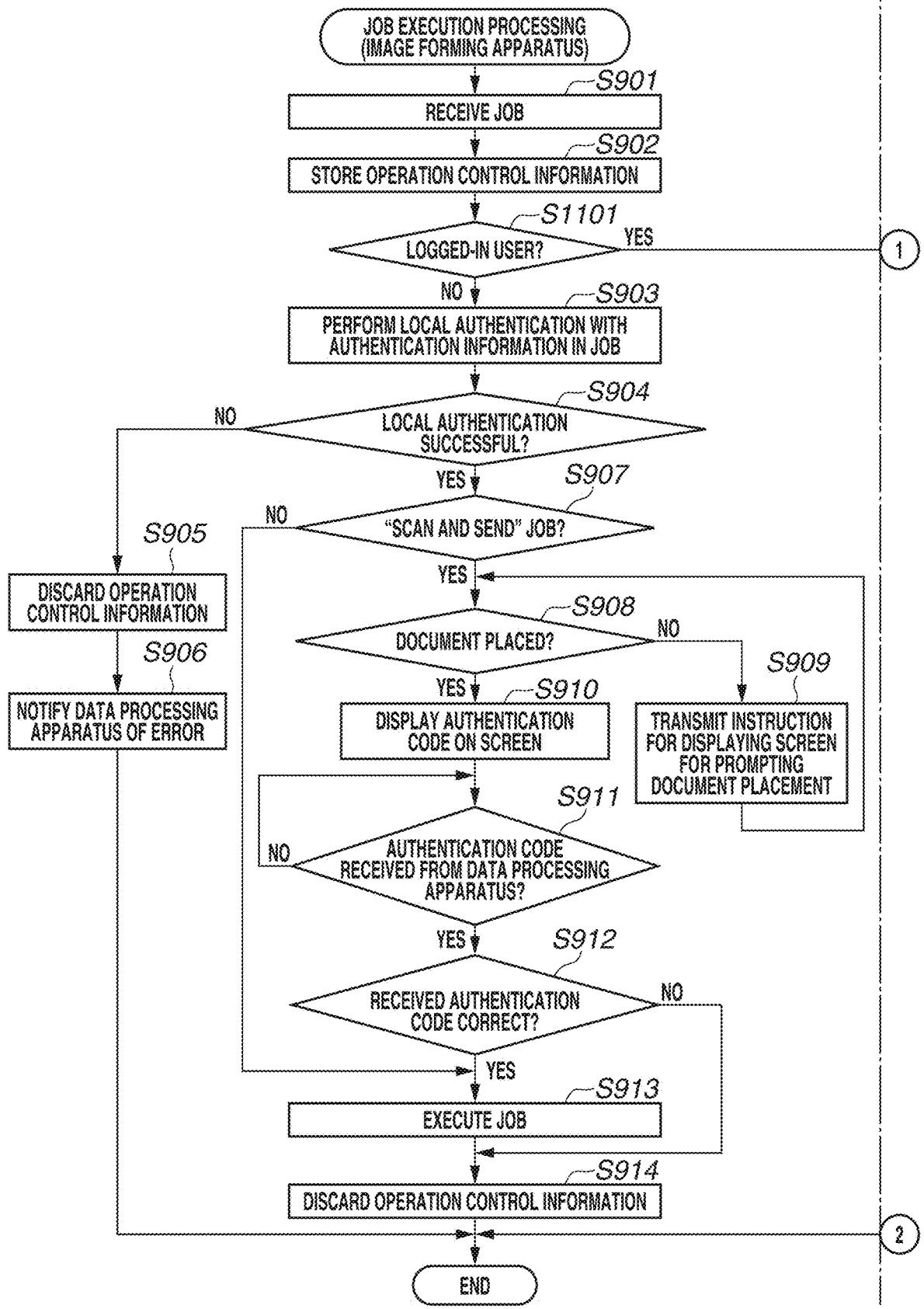

METHOD, SYSTEM, AND IMAGE FORMING APPARATUS

BACKGROUND OF THE INVENTION

Field of the Invention

The present invention relates to a data processing system in which a job is executed through wireless communication between a data processing apparatus and an image forming apparatus.

Description of the Related Art

With the recent increase in the use of high-performance mobile terminals called smartphones, the number of image forming apparatuses in collaboration with such mobile terminals is also increasing. For example, a mobile terminal is able to issue a print instruction to an image forming apparatus through wireless communication. The mobile terminal receives an operation from a user, generates a print job based on selected print data and various pieces of print setting information (e.g., information about color setting and the number of copies) that are set, and then transmits the print job to a Multi-Function Peripheral (MFP) to instruct the MFP to execute print processing. In this case, a network communication between the mobile terminal and the image forming apparatus is established using a communication protocol such as Transmission Control Protocol/Internet Protocol (TCP/IP), Near Field Communication (NFC), and Bluetooth® and can be implemented by a known technique. Japanese Patent Application Laid-Open No. 2015-207875 discusses a method for improving operability in a case where a mobile terminal issues an instruction for copy processing and an instruction for scan data transmission processing to an image forming apparatus. In the case where the mobile terminal is able to issue the instruction for scan data transmission processing to the image forming apparatus, a problem may arise because of user misoperation. For example, in a case where a sheet is placed on the original platen of the image forming apparatus by a user A in front of the apparatus, and a user B away from the image forming apparatus issues an instruction for scan data transmission processing for the sheet by mistake, from the mobile terminal, the user B can improperly obtain scan data. Japanese Patent Application Laid-Open No. 2020-145493 discloses a method for transmitting scan data upon reception of a predetermined operation on the operation panel of the image forming apparatus after issuance of a scan data transmission instruction on the mobile terminal. This method enables the user to transmit scan data after performing a confirmation operation on the image forming apparatus, thus preventing misoperation.

However, in the case where scan data is transmitted upon reception of a predetermined operation on the operation panel of the image forming apparatus as discussed in Japanese Patent Application Laid-Open No. 2020-145493, the user needs to operate the mobile terminal to issue a processing execution instruction and then also operate the operation panel of the image forming apparatus. This means that the user needs to operate two different apparatuses, resulting in degraded user operability. It is desirable that operation be completed on the user's mobile terminal.

SUMMARY OF THE INVENTION

In view of the above-described issues, the present invention is directed to providing a method for preventing degradation of user operability while making the user suitably confirm the processing execution in a case where an instruction for scan data transmission processing can be issued from a terminal to an image forming apparatus.

According to an aspect of the present invention, a method performed by a data processing apparatus and an image forming apparatus includes transmitting, by the data processing apparatus, an execution instruction for a job to the image forming apparatus, generating, by the image forming apparatus, an authentication code corresponding to the transmitted execution instruction and displaying the authentication code or information representing the encrypted authentication code on a display unit of the image forming apparatus, transmitting, by the data processing apparatus, an authentication code to the image forming apparatus, and executing, by the image forming apparatus, a job corresponding to the transmitted execution instruction in a case where a predetermined condition is determined to be satisfied based on the transmitted authentication code and the generated authentication code.

Further features of the present invention will become apparent from the following description of exemplary embodiments with reference to the attached drawings.

BRIEF DESCRIPTION OF THE DRAWINGS

FIGS. 8A, 8B, 8C, and 8D illustrate examples of screens displayed by the data processing apparatus.

FIG. 11, which includes FIGS. 11A and 11B, is a flowchart illustrating job execution processing of an image forming apparatus according to a second exemplary embodiment.

DESCRIPTION OF THE EMBODIMENTS

Exemplary embodiments of the present invention will be described in detail below using examples with reference to the accompanying drawings. Components described in the exemplary embodiments are to be considered as merely examples and are not intended to limit the scope of the present invention.

Figure 1:
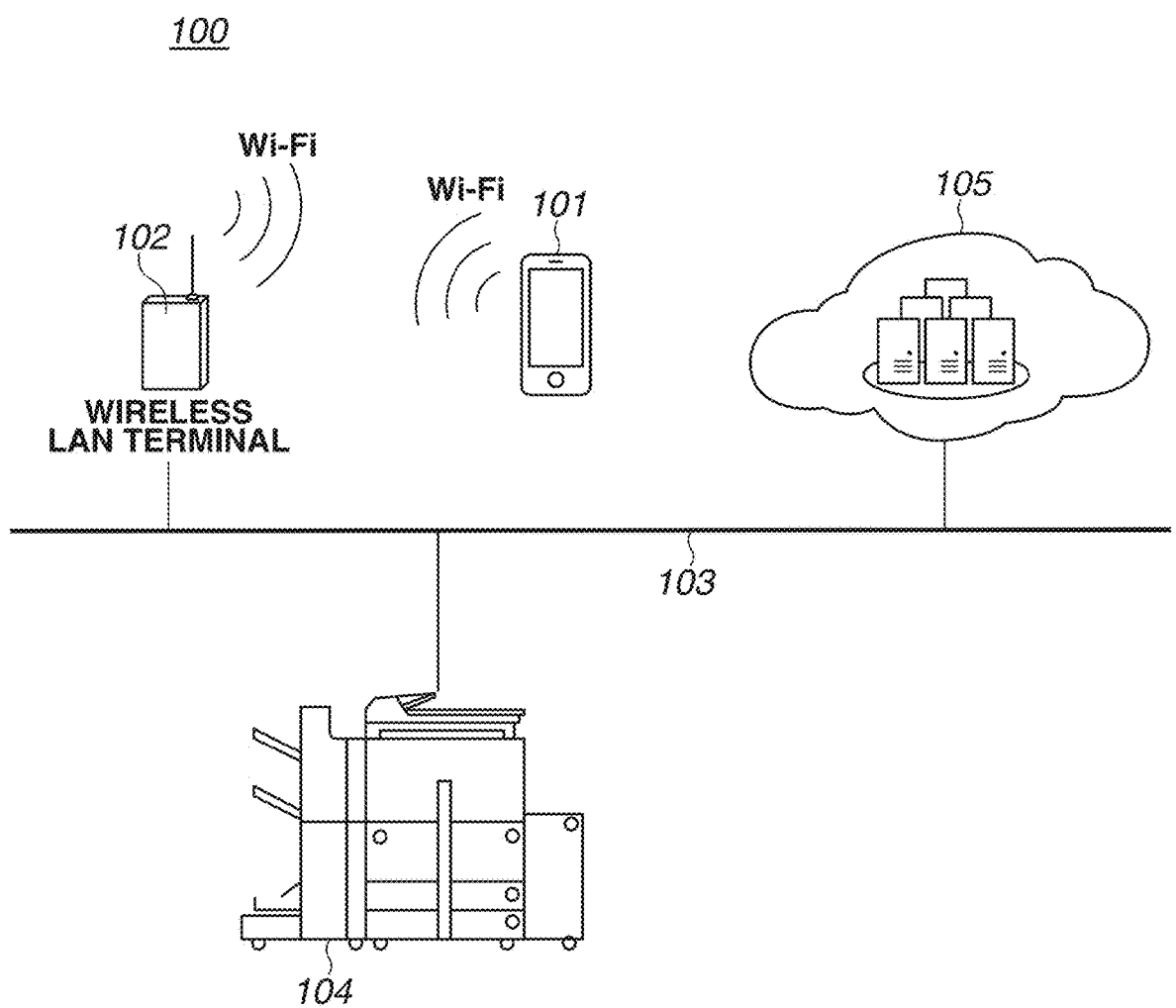
FIG. 1 illustrates a configuration of a data processing system.

FIG. 1 illustrates a configuration of an information processing system according to a first exemplary embodiment. A data processing system 100 includes a data processing apparatus 101, a wireless Local Area Network (LAN) terminal 102, an image forming apparatus 104, and a cloud server 105 which are all connected with each other via a network 103.

The data processing apparatus 101 is a mobile terminal such as a smartphone and a tablet. An operating system for a small terminal and programs for controlling phone calls and data communications may run on the data processing apparatus 101. Alternatively, the data processing apparatus 101 may be a personal computer not provided with audio control, position detection control, and portable telephone data communication functions. The data processing apparatus 101 connects to the network 103 via the wireless LAN terminal 102.

The wireless LAN terminal 102, which is a wireless LAN master device having common network and router functions, provides a wireless LAN in homes and offices.

The image forming apparatus 104 is a digital Multi-Function Peripheral (MFP) having a printer function, a copy function, a scanner function, a fax transmission function, and other various functions for job execution. The user operates the data processing apparatus 101 to issue a job execution instruction to the image forming apparatus 104 to perform each of the functions of the image forming apparatus 104.

The cloud server 105 manages data to be used by the data processing apparatus 101 and the image forming apparatus 104 and performs processing for expanding various functions, via the network 103. While, in the first exemplary embodiment, the image forming apparatus 104 and the cloud server 105 are connected to the network 103 by wire, the image forming apparatus 104 and the cloud server 105 may be wirelessly connected to the network 103 via the wireless LAN terminal 102, as with the data processing apparatus 101.

Further, the data processing apparatus 101 and the image forming apparatus 104 are capable of short-range wireless communication using wireless signals, such as Near Field Communication (NFC) and Bluetooth Low Energy (BLE). The image forming apparatus 104 has connection information (Internet Protocol (IP) address and Media Access Control (MAC) address) for wireless LAN connection with the data processing apparatus 101 in an NFC communication unit 310 and a BLE communication unit 311 (described below). The data processing apparatus 101 acquires the connection information by the short-range wireless communication. The data processing apparatus 101 and the image forming apparatus 104 start wireless LAN communication based on the acquired connection information. More specifically, by switching the communication to the wireless LAN communication such as Wi-Fi based on the connection information exchanged between the apparatuses in the short-range wireless communication such as NFC communication and BLE communication (the switching is referred to as handover), the wireless LAN communication is established between the data processing apparatus 101 and the image forming apparatus 104.

Figure 2:
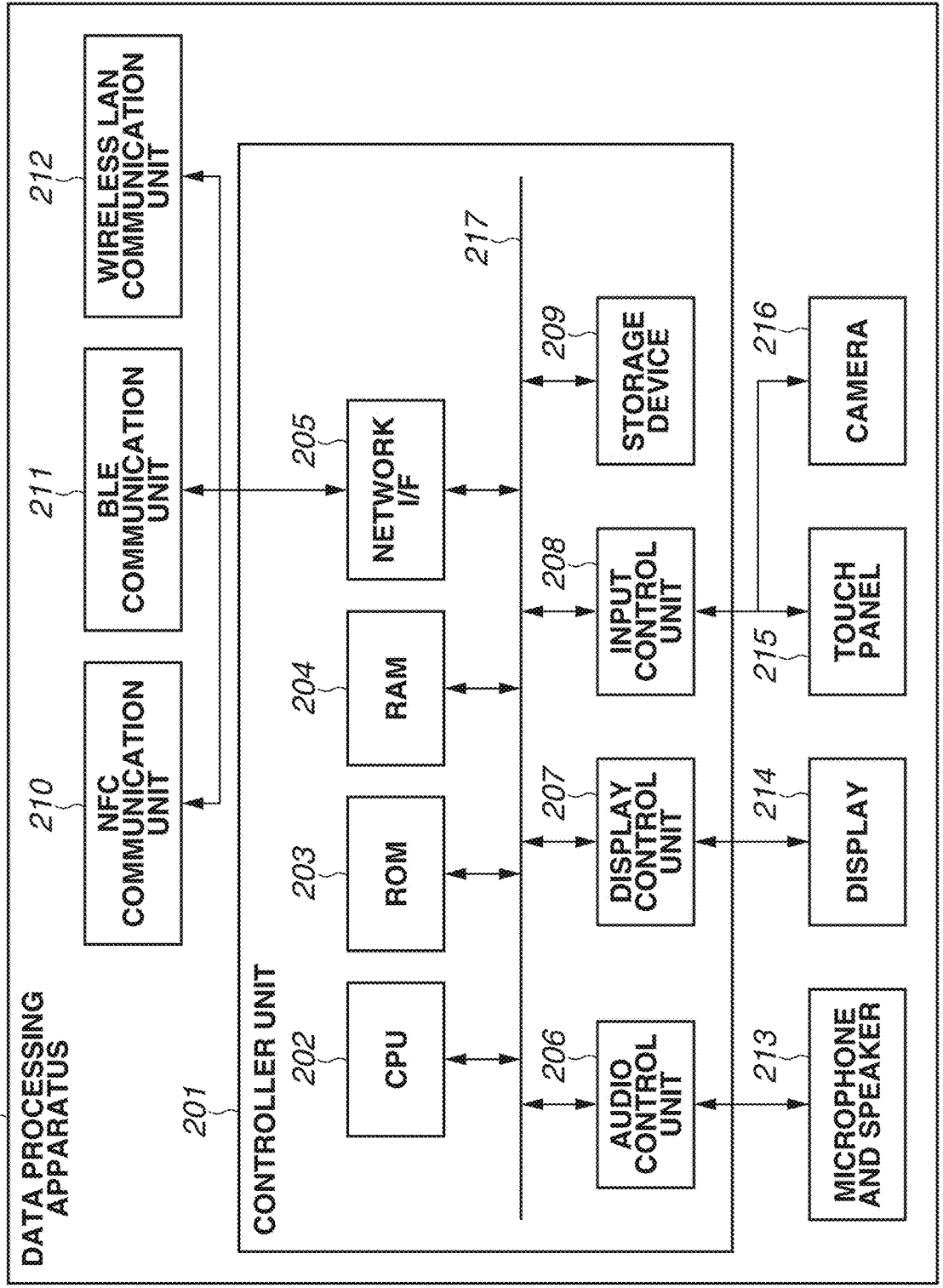
FIG. 2 is a block diagram illustrating a hardware configuration of a data processing apparatus.

FIG. 2 is a block diagram illustrating a hardware configuration of the data processing apparatus 101 according to the present exemplary embodiment.

The data processing apparatus 101 includes a controller unit 201. The controller unit 201 controls various communication units including an NFC communication unit 210, a BLE communication unit 211, and a wireless LAN communication unit 212, and various user interface (UI) units including a microphone and speaker 213, a display 214, and a touch panel 215.

The controller unit 201 includes a central processing unit (CPU) 202, a read only memory (ROM) 203, a random access memory (RAM) 204, a network interface (I/F) 205, an audio control unit 206, a display control unit 207, an input control unit 208, and a storage device 209 which are all connected with each other via a system bus 217.

The CPU 202 controls the entire system of the data processing apparatus 101. The ROM 203 stores the operating system of the data processing apparatus 101 and applications that control phone calls and data communications. The CPU 202 executes various programs. The RAM 204 is a memory used by the CPU 202 to execute various programs and is a work memory area used by an application to execute a program.

The storage device 209, which is a nonvolatile memory, records various operation mode settings and operation logs that need to be retained even after re-activation of the data processing apparatus 101. Particularly in the present exemplary embodiment, the storage device 209 stores setting information to be used to issue an execution instruction to the image forming apparatus 104, and setting information to be acquired from the image forming apparatus 104.

The network I/F 205 is connected with the NFC communication unit 210, the BLE communication unit 211, and the wireless LAN communication unit 212 to control various wireless communications with the image forming apparatus 104 and the cloud server 105.

The audio control unit 206 controls input and output of audio data via the microphone and speaker 213. The display control unit 207 controls output of image data to be displayed on the display 214. The input control unit 208 controls the input of instruction information issued by the user using buttons and the touch panel 215. The user is provided with various applications to be executed by the data processing apparatus 101 by using the audio control unit 206, the display control unit 207, and the input control unit 208.

Figure 3:
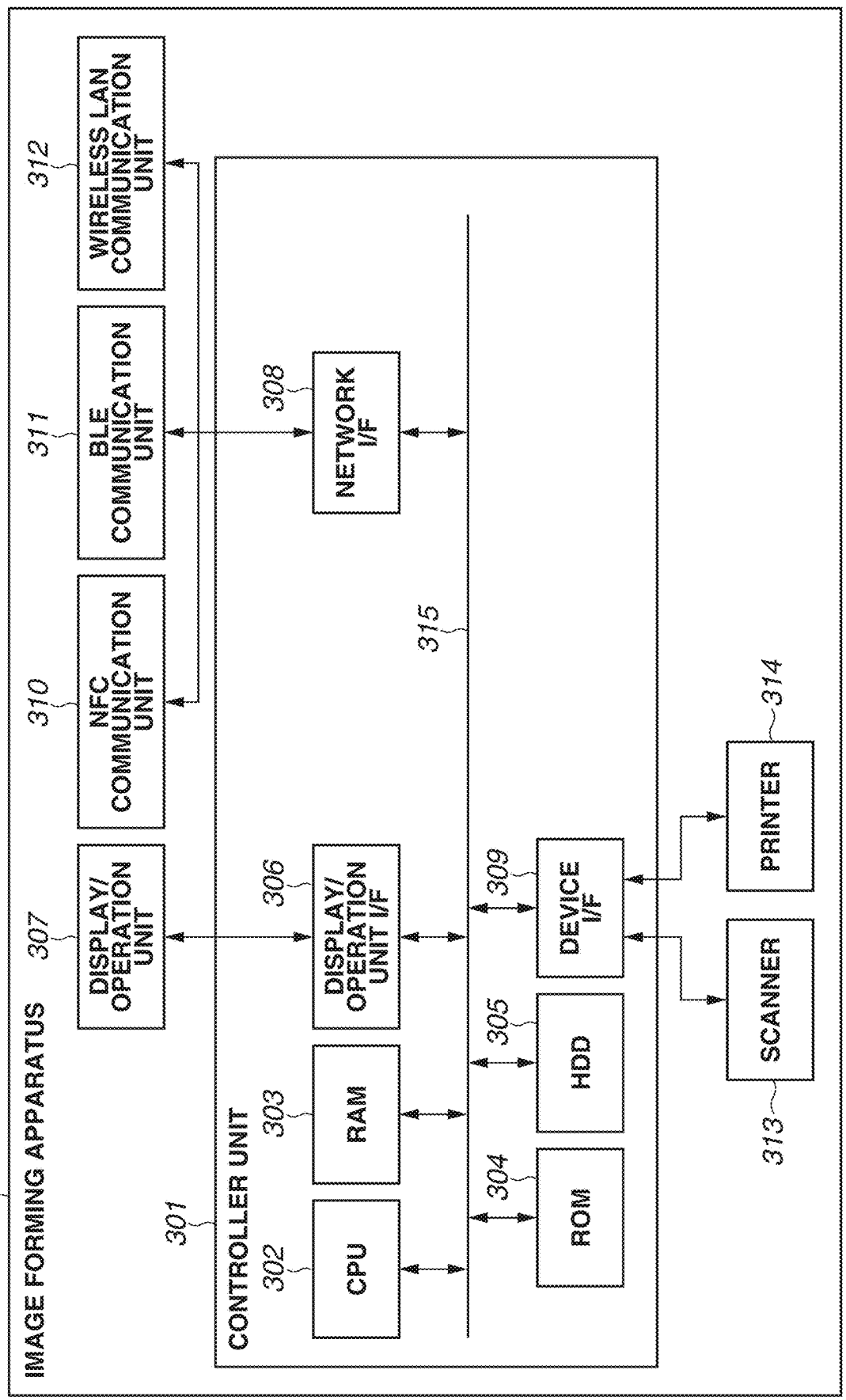
FIG. 3 is a block diagram illustrating a hardware configuration of an image forming apparatus.

FIG. 3 is a block diagram illustrating a hardware configuration of the image forming apparatus 104 according to the present exemplary embodiment.

The image forming apparatus 104 includes a controller unit 301 that controls various communication units including the NFC communication unit 310, the BLE communication unit 311, and a wireless LAN communication unit 312. The controller unit 301 also controls a display/operation unit 307, a scanner 313, and a printer 314. In a case where the user uses the copy function, the controller unit 301 controls the scanner 313 to acquire image data of a document and controls the printer 314 to print an image on paper and output the paper. In a case where the user uses the scanning function, the controller unit 301 controls the scanner 313 to acquire image data of a document, converts the image data into code data, and then transmits the code data to the data processing apparatus 101 and the cloud server 105 via the network 103. In a case where the user uses the print function, the controller unit 301 receives image data (code data) via the data processing apparatus 101, the cloud server 105, and the network 103. Then, the controller unit 301 converts the received print data into image data and transmits the image data to the printer 314. The printer 314 prints an image on paper based on the received image data and then outputs the paper. The image forming apparatus 104 has a fax reception function for receiving data from Integrated Services Digital Network (ISDN) and printing the data, and a fax transmission function for transmitting scan data to ISDN. An operation for executing each of the functions is referred to as a job. The image forming apparatus 104 performs predetermined processing based on a job corresponding to each function.

The controller unit 301 includes a CPU 302, a RAM 303, a ROM 304, a hard disk drive (HDD) 305, a display/operation unit I/F 306, a network I/F 308, and a device I/F 309 which are all connected with each other via a system bus 315.

The CPU 302 controls an entire system of the image forming apparatus 104. The RAM 303 is a system work memory used for the operation of the CPU 302, and also serves as an image memory for temporarily storing image data and setting data. The RAM 303 stores the operating system, system software, application software, and other programs and also stores data. The RAM 303 also stores scanned image data read by the scanner 313 and stores print image data received from the data processing apparatus 101 via the network 103. The ROM 304 stores the boot program of the system. The HDD 305 stores the operating system, system software, application software, image data, and setting data.

The display/operation unit I/F 306 interfaces with the display/operation unit 307 and outputs information to be displayed on the display/operation unit 307 to the display/operation unit 307. In addition, the display/operation unit I/F 306 receives information input on the display/operation unit 307 by the user.

The display/operation unit 307 displays information to be provided to the user and receives an operation from the user. The display/operation unit 307 includes, for example, an operation panel such as a touch panel display, and a hardware keyboard.

The network I/F 308 is connected with the NFC communication unit 310, the BLE communication unit 311, and the wireless LAN communication unit 312 to control various wireless communications with the data processing apparatus 101 and the cloud server 105. The wireless LAN communication unit 312 forms a wireless LAN with the data processing apparatus 101 via the network 103. The NFC communication unit 310 and the BLE communication unit 311 perform short-range wireless communication with the data processing apparatus 101 using wireless signals. The image forming apparatus 104 performs the transmission and reception of job setting information and image data with the data processing apparatus 101 via the network I/F 308 and then executes a job received from the data processing apparatus 101. Hereinafter, the setting information attached to a job is referred to as the job setting information. A print job is attached with job setting information including, for example, the number of copies (1), the color setting (monochrome), and the paper size (A4).

The device I/F 309 connects the scanner 313 and the printer 314 for reading and printing image data, respectively, with the controller unit 301 and inputs and outputs the image data.

Figure 4:
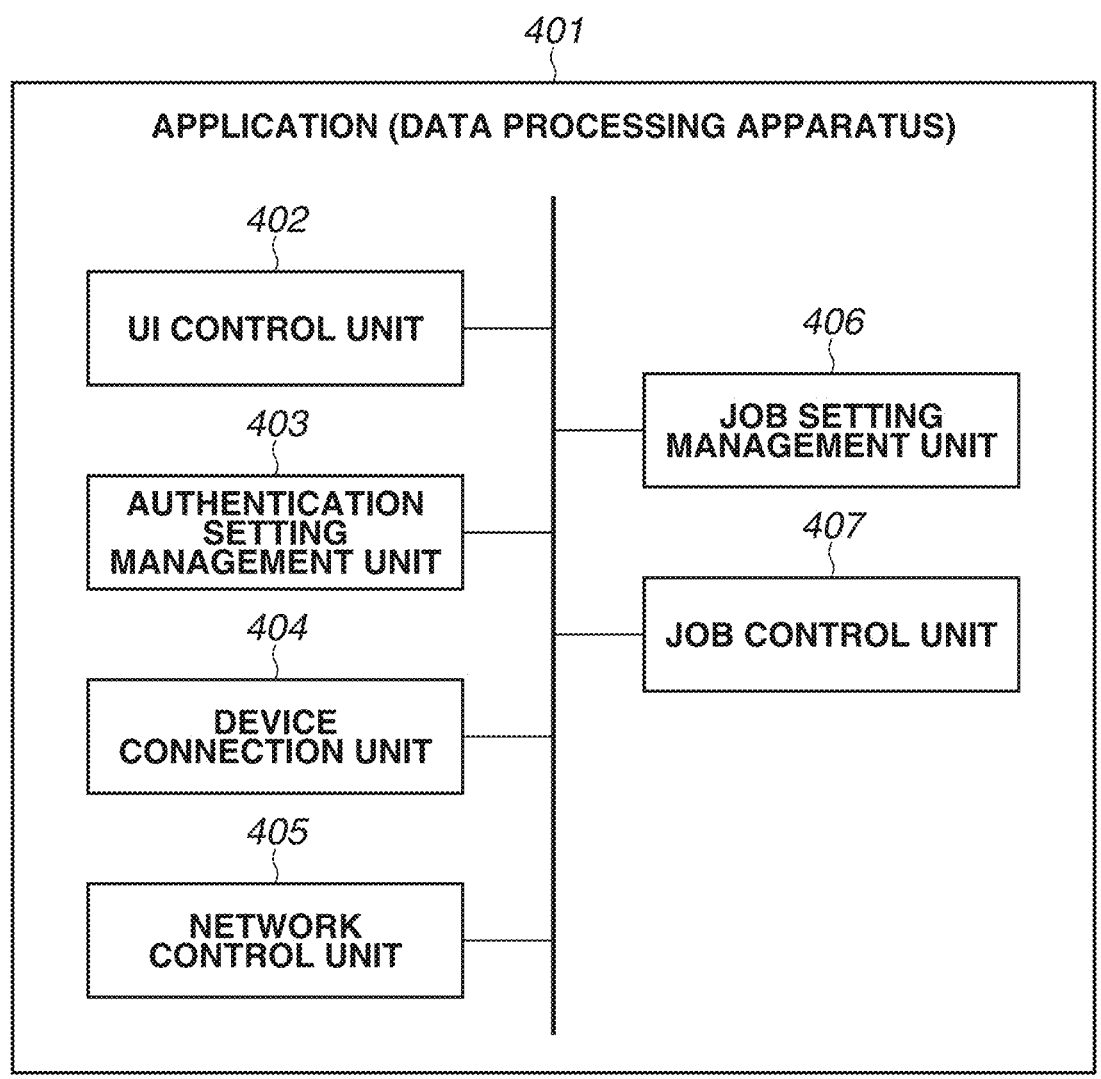
FIG. 4 is a block diagram illustrating a software configuration of the data processing apparatus.

FIG. 4 is a block diagram illustrating a software configuration of the data processing apparatus 101 according to the present exemplary embodiment.

An application 401 is software executed by the CPU 202 of the data processing apparatus 101, and is stored in the RAM 204 and the storage device 209.

A UI control unit 402 receives settings (job setting information) input on the touch panel 215 by the user and then transmits the settings to a job setting management unit 406 via the input control unit 208. The UI control unit 402 also receives responses from the job setting management unit 406 and a job control unit 407 and then outputs information to a display unit, i.e., the display 214, via the display control unit 207. The UI control unit 402 further receives authentication information input on the touch panel 215 by the user and then transmits the received authentication information to an authentication setting management unit 403 via the input control unit 208.

The authentication setting management unit 403 transmits the authentication information such as user information received from the UI control unit 402 to a network control unit 405. The authentication information is used in authentication processing (described below) by the image forming apparatus 104 via the network 103. The authentication information such as user information may be stored in the authentication setting management unit 403.

A device connection unit 404 establishes short-range wireless communication via the NFC and BLE communication units of the data processing apparatus 101 and the image forming apparatus 104, and establishes wireless LAN communication via the network 103. For example, in the case of NFC, when the user brings the NFC communication unit 210 of the data processing apparatus 101 and the NFC communication unit 310 of the image forming apparatus 104 close to each other, the two apparatuses start short-range wireless communication. In the case of BLE, the user brings the BLE communication unit 211 of the data processing apparatus 101 and the BLE communication unit 311 of the image forming apparatus 104 close to each other. When radio field intensity of a BLE beacon received from the image forming apparatus 104 becomes larger than or equal to a predetermined value, the device connection unit 404 starts bidirectional short-range wireless communication. When the user performs an operation for bringing the NFC and BLE communication units of the data processing apparatus 101 and the image forming apparatus 104 close to each other in this way (the operation is referred to as a touch operation), the device connection unit 404 acquires the connection information (such as an IP address) necessary for wireless LAN communication from the image forming apparatus 104. Then, the data processing apparatus 101 starts the wireless LAN connection with the image forming apparatus 104 by using the acquired connection information. The image forming apparatus 104 and the data processing apparatus 101 can also establish the wireless LAN communication by reading a QR Code® indicating the connection information displayed on the image forming apparatus 104 without performing the short-range wireless communication.

The network control unit 405 transmits a job (including the job setting information, an execution instruction command, and image data) and user authentication information to the image forming apparatus 104 via the network 103. Further, the network control unit 405 receives the job setting information stored by the image forming apparatus 104 via the network 103.

The job setting management unit 406 stores the job setting information input by the user via the UI control unit 402 and the job setting information received from the image forming apparatus 104 and the cloud server 105 via the network control unit 405 in the RAM 204 and the storage device 209. In this case, the job setting management unit 406 manages these pieces of job setting information as "Favorite" that is frequently used by the user. The job setting management unit 406 also manages, as "Preset", the job setting information prestored in the RAM 204 and the storage device 209 at the time of installation of the application 401.

The job control unit 407 generates information to be included in a job execution instruction based on the job setting information "Favorite" and "Preset" registered by the job setting management unit 406 and then transmits the job execution instruction to the image forming apparatus 104 via the network 103. In addition, the job control unit 407 acquires a job execution status and device operation states of the scanner 313 and the printer 314 from the image forming apparatus 104 via the network 103 and then transmits these pieces of information to the UI control unit 402.

Figure 5:
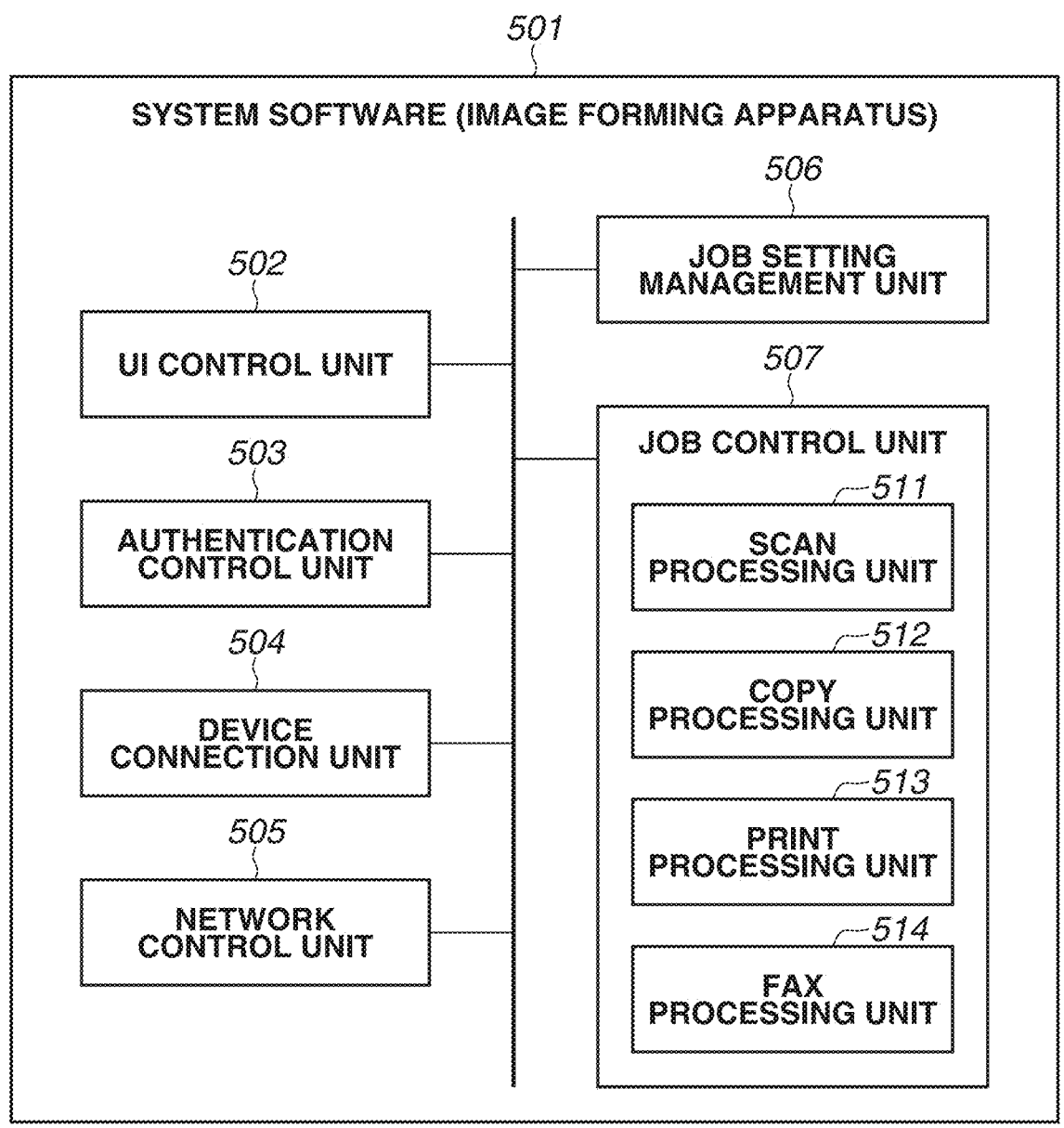
FIG. 5 is a block diagram illustrating a software configuration of the image forming apparatus.

FIG. 5 is a block diagram illustrating a software configuration of the image forming apparatus 104 according to the present exemplary embodiment.

A system software 501 is software executed by the CPU 302 of the image forming apparatus 104, and is stored in the RAM 303 and the HDD 305.

A UI control unit 502 receives the job setting information input on the display/operation unit 307 by the user and then transmits the job setting information to a job setting management unit 506. The UI control unit 502 also receives responses from the job setting management unit 506 and a job control unit 507 and then outputs information to the display/operation unit 307.

An authentication control unit 503 performs user identification and user authentication processing based on the authentication information received from the data processing apparatus 101 and then returns a result of the processing.

A device connection unit 504 performs short-range wireless communication between the data processing apparatus 101 and the image forming apparatus 104 and establishes wireless LAN communication via the network 103.

A network control unit 505 receives a job (including the job setting information, a job execution instruction command, and image data) and the user authentication information from the data processing apparatus 101 via the network 103. Further, the network control unit 505 transmits the job setting information stored in the image forming apparatus 104 to the data processing apparatus 101 via the network 103.

The job setting management unit 506 stores the job setting information input by the user via the UI control unit 502 and the job setting information received from the data processing apparatus 101 and the cloud server 105 via the network control unit 505 in the RAM 303 and the HDD 305. In this case, the job setting management unit 506 manages these pieces of job setting information as "Favorite" that is frequently used by the user. The job setting management unit 406 also manages, as "Preset", the job setting information prestored in the RAM 303 and the HDD 305 at the time of installation of the system software 501. The job setting management unit 506 also manages, as "History", the job setting information included in the job that has been executed by the image forming apparatus 104.

The job control unit 507 controls processing units including a scan processing unit 511, a copy processing unit 512, a print processing unit 513, and a fax processing unit 514 to execute various jobs based on a received job. In this case, the job control unit 507 executes a job based on the job setting information set on the display/operation unit 307 by the user and the job setting information "Favorite" and "Preset" registered by the job setting management unit 506. Further, the job control unit 507 receives a job execution request received from the data processing apparatus 101 via the network 103 and then executes various jobs based on the job setting information of the received job. In addition, the job control unit 507 transmits a job execution status and device operation states of the scanner 313 and the printer 314 to the data processing apparatus 101 via the network 103.

Figure 6:
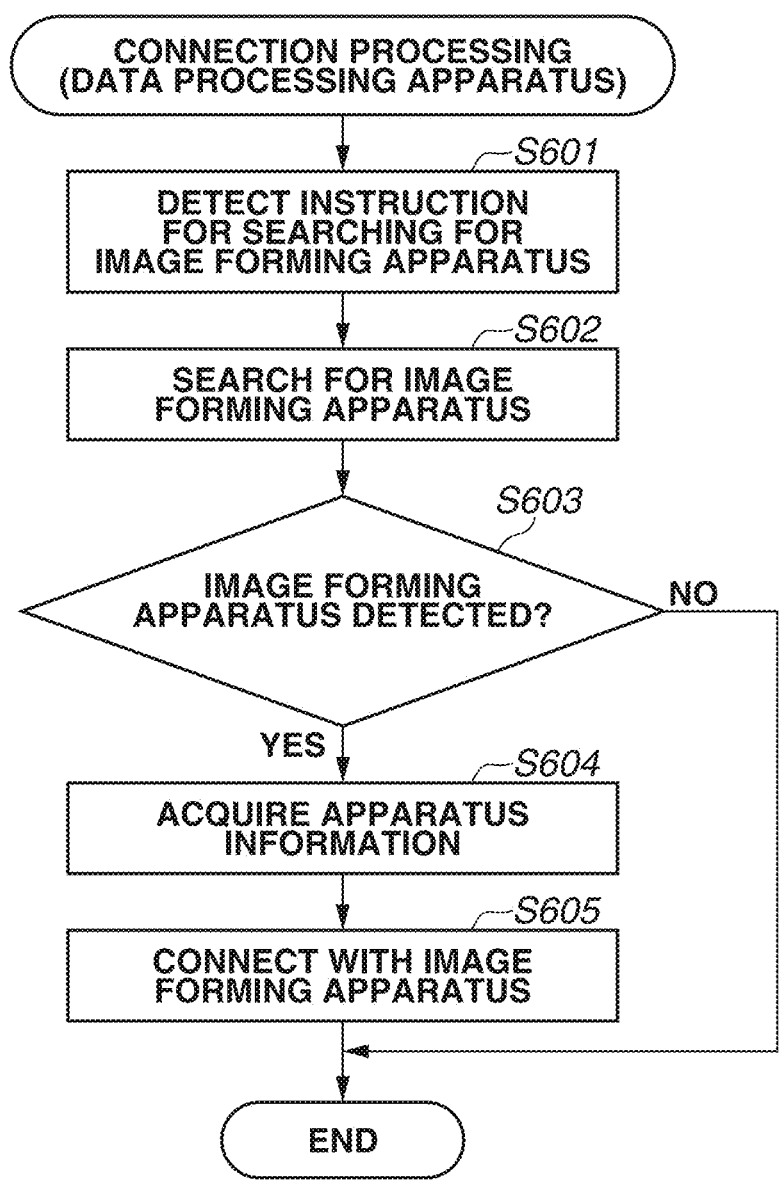
FIG. 6 is a flowchart illustrating connection processing of the data processing apparatus according to a first exemplary embodiment.

FIG. 6 is a flowchart illustrating connection processing performed by the data processing apparatus 101 to connect with the image forming apparatus 104 according to the present exemplary embodiment. The flowchart in FIG. 6 is implemented by the CPU 202 of the data processing apparatus 101 loading a program for implementing each control module stored in the ROM 203 or the storage device 209 into the RAM 204 and then executing the program.

In step S601, the UI control unit 402 detects an instruction for searching for the image forming apparatus 104 from the user.

In step S602, by using Wi-Fi®, the device connection unit 404 searches for the image forming apparatus 104 that is supported by the application 401 and existing on the network 103 via the wireless LAN terminal 102.

In step S603, when the device connection unit 404 cannot detect the image forming apparatus 104 as a result of the search in step S602 (NO in step S603), the processing exits the flowchart. On the other hand, when the device connection unit 404 detects the image forming apparatus 104 (YES in step S603), the processing proceeds to step S604. In step S604, the device connection unit 404 acquires apparatus information. In addition, by performing short-range wireless communication with the NFC and BLE communication units of the image forming apparatus 104, the device connection unit 404 is able to acquire the connection information such as the IP address, search for the image forming apparatus 104 based on the acquired connection information, and acquire the apparatus information. The apparatus information refers to, for example, identification information of the image forming apparatus 104, such as the MAC address and apparatus name, and may further include capability information such as color information and supported format information.

In step S605, the device connection unit 404 starts the connection with the image forming apparatus 104 based on the acquired apparatus information, and ends the processing.

The data processing apparatus 101 that started the connection with the image forming apparatus 104 is able to issue instructions for copy, print, and scanned image transmission jobs to the image forming apparatus 104 by using the application 401. For example, the data processing apparatus 101 receives a scan setting and a scanned image destination setting from the user on the touch panel 215, generates a job, and transmits the job to the image forming apparatus 104. The image forming apparatus 104 scans a document and then transmits generated image data to a set transmission destination based on the received job. This enables the user to remotely instruct the image forming apparatus 104 to scan a document and transmit image data. However, if the user in a location away from the image forming apparatus 104 instructs the image forming apparatus 104 to scan a document and transmit image data in this way, the user may possibly scan a document placed on the image forming apparatus 104 by another person and then transmit image data by misoperation. Further, if a malicious user of the data processing apparatus 101 remotely instructs the image forming apparatus 104 to scan a document and transmit image data at a timing when the other person places a document on the image forming apparatus 104, the malicious user can improperly acquire and transmit other person's document image. Thus, the present exemplary embodiment will be described below with regard to a method for preventing job execution by mistake (due to user misoperation) and improper job execution even in a case where the data processing apparatus 101 is able to instruct the image forming apparatus 104 to execute a job. More specifically, when the data processing apparatus 101 transmits a job to the image forming apparatus 104, the image forming apparatus 104 displays an authentication code on the display of the image forming apparatus 104, and the user inputs the displayed authentication code on the data processing apparatus 101 and then transmits the code to the image forming apparatus 104. When the image forming apparatus 104 determines that the received code is correct, the image forming apparatus 104 executes the job. This means that the user can execute a job after inputting an authentication code as a confirmation operation. In addition, the configuration ensures that the user operating the data processing apparatus 101 is in front of the image forming apparatus 104, preventing a job instruction from being improperly executed.

Figure 7:
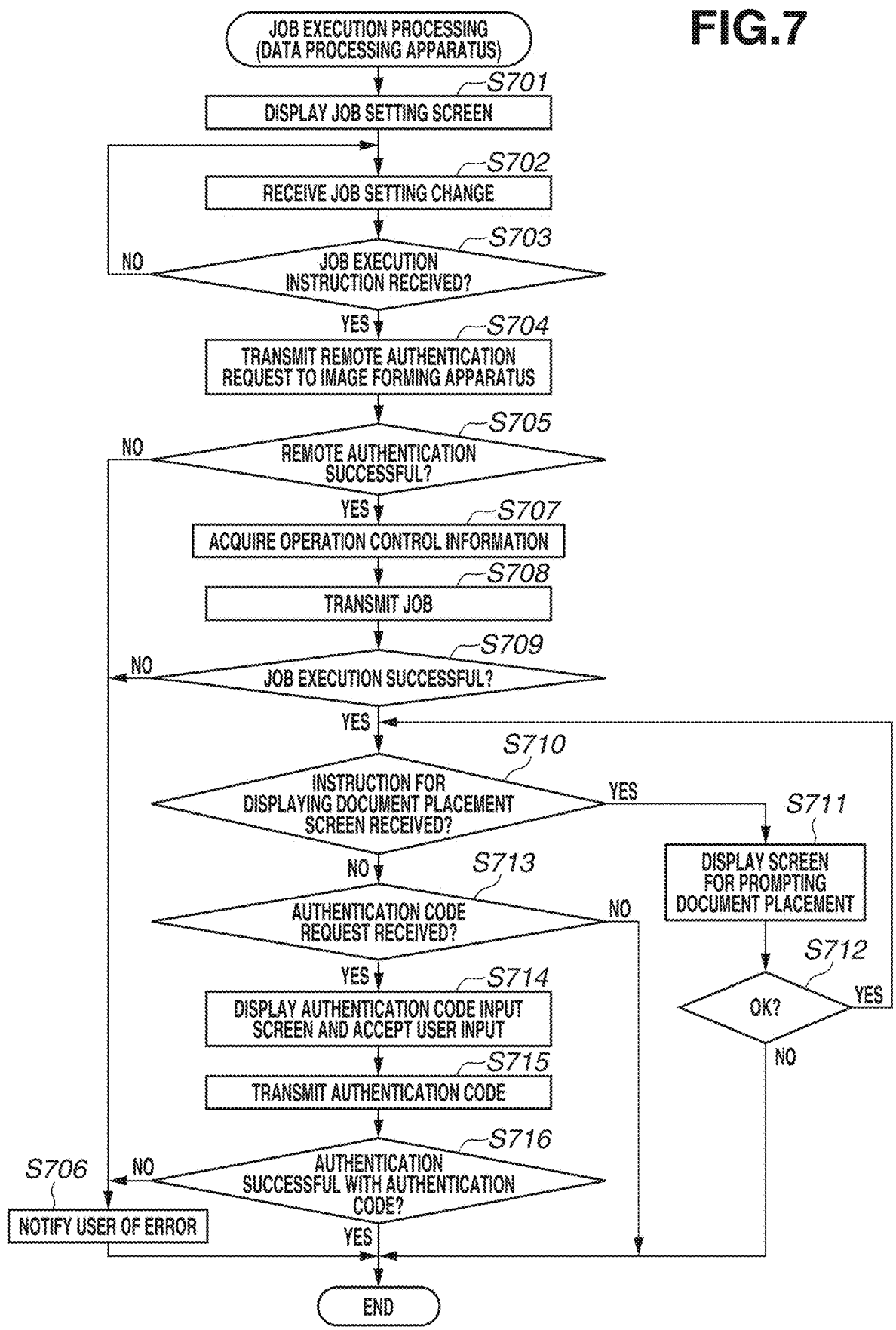
FIG. 7 is a flowchart illustrating job execution processing of the data processing apparatus according to the first exemplary embodiment.

Job execution processing executed by the data processing apparatus 101 according to the present exemplary embodiment will be described below with reference to FIGS. 7, 8A, 8B, 8C, and 8D. FIG. 7 is a flowchart illustrating the job execution processing. The flowchart is implemented by the CPU 202 of the data processing apparatus 101 loading a program for implementing each control module stored in the ROM 203 or the storage device 209 into the RAM 204 and then executing the program. FIGS. 8A, 8B, 8C, and 8D illustrate examples of screens displayed by the application 401 of the data processing apparatus 101.

Figure 8A:
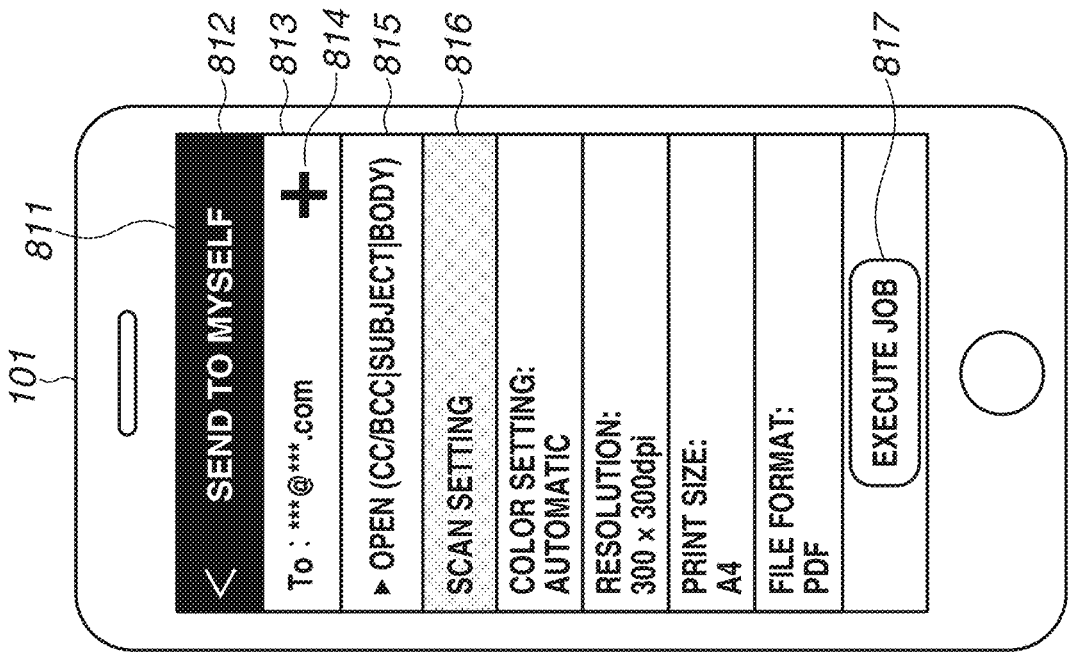

A Function List screen 801 in FIG. 8A is the menu screen of the application 401. For example, the Function List screen 801 is displayed when the application 401 is activated. When the data processing apparatus 101 has established communication with the image forming apparatus 104 by the processing of the flowcharts in FIG. 6, the Function List screen 801 displays the name of a job transmission destination apparatus as indicated in an apparatus name 808. The Function List screen 801 also displays a Copy button 805 for issuing a copy instruction, a Print button 806 for issuing a print instruction, and a Scan and Send button 807 for issuing a scan and transmission instruction. When one of the buttons is pressed, a job setting screen is displayed. The Function List screen 801 also displays a favorite button 802 to which desired job setting values are registered as favorable settings by the user, and preset buttons 803 and 804. When one of the buttons is pressed, the job setting screen reflecting the desired setting values is displayed. For example, the flowchart illustrated in FIG. 7 will be described below using an example where the user presses the "Send to Myself" button 802 for issuing an instruction for transmitting image data generated by scanning to an e-mail address of the user.

Figure 8B:
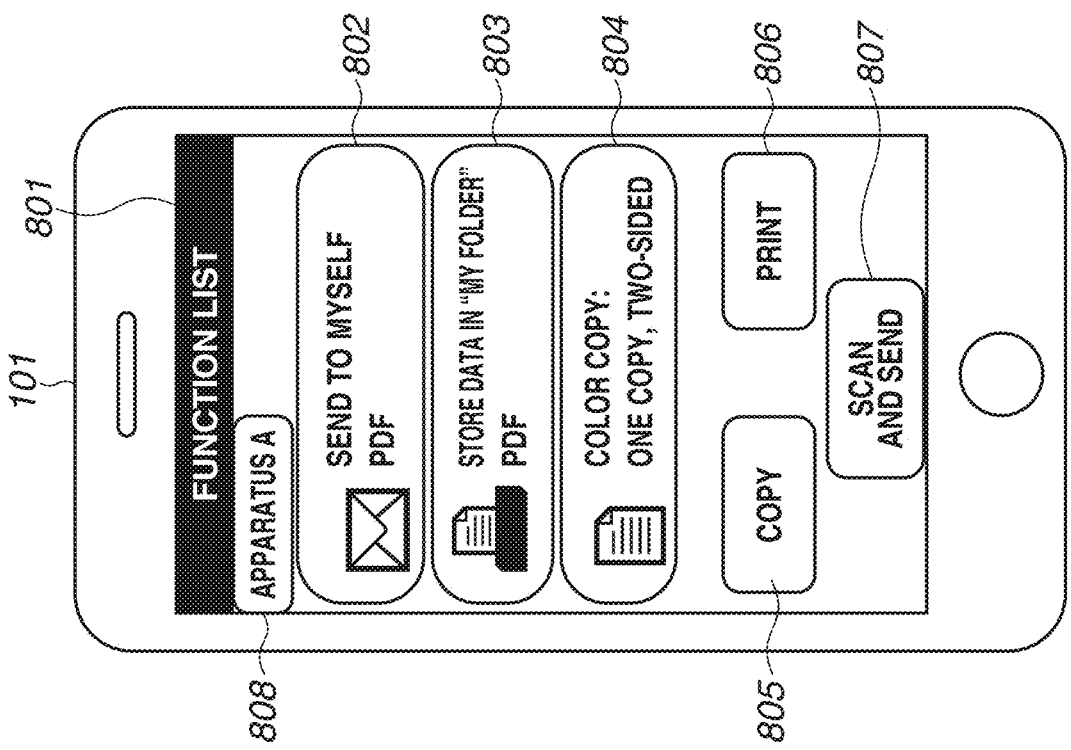

Upon reception of the operation for selecting the "Send to Myself" button 802 from the user, in step S701, the UI control unit 402 displays the job setting screen (see FIG. 8B).

In step S702, the UI control unit 402 receives a job setting change from the user on a "Send to Myself" screen 811 in FIG. 8B. The "Send to Myself" screen 811 in FIG. 8B displays a title field 812 including the screen title, and a back button for canceling the settings and moving back to the previous screen. An e-mail address setting area 813 is an area for inputting a destination e-mail address by using a software keyboard. Pressing an address book start button 814 activates an address book of the data processing apparatus 101. When the user selects an e-mail address in the address book, the selected e-mail address is displayed in the e-mail address setting area 813. A plurality of e-mail addresses can be set. When an Open button 815 is pressed, a screen for setting carbon copy (CC), blind carbon copy (BCC), subject, body text, and file name appears, enabling the user to input each item. In a Scan Setting area 816, buttons for making scan settings used when the image forming apparatus 104 scans a document are arranged, such as a color setting and resolution. The settings can be changed by pressing each button.

In step S703, the UI control unit 402 determines whether a job execution instruction is received from the user. When an Execute Job button 817 in FIG. 8B is pressed, i.e., when the UI control unit 402 determines that a job execution instruction is received (YES in step S703), the processing proceeds to step S704. On the other hand, when the UI control unit 402 determines that a job execution instruction is not received (NO in step S703), the processing returns to step S702.

In step S704, the device connection unit 404 acquires the user information such as the user name and password stored in the RAM 204 or the storage device 209 and then transmits the user information to the image forming apparatus 104. More specifically, the device connection unit 404 issues a remote authentication request to the image forming apparatus 104. The image forming apparatus 104 subjected to the remote authentication request is the image forming apparatus having been connected in the connection processing in FIG. 6. Remote authentication is authentication for permitting the start of communication between the data processing apparatus 101 and the image forming apparatus 104 and is different from local authentication (described below).

In step S705, the device connection unit 404 determines whether the remote authentication is successful based on a response from the image forming apparatus 104 to the remote authentication request issued in step S704. When the remote authentication is unsuccessful (NO in step S705), the processing proceeds to step S706. In step S706, the UI control unit 402 displays an error screen on the display 214. Then, the processing exits this flowchart. On the other hand, when the remote authentication is successful (YES in step S705), the processing proceeds to step S707. In step S707, the job control unit 407 acquires operation control information. The operation control information is information that enables the image forming apparatus 104 to receive only instructions from the data processing apparatus 101 and that, in a case where the image forming apparatus 104 receives a job including the operation control information from the data processing apparatus 101, prevents the image forming apparatus 104 from executing a job other than the received job.

In step S708, the job control unit 407 generates a job based on the job setting information set in step S702, the user information, the password, and the operation control information and then transmits the job to the image forming apparatus 104 being connected to issue a job execution request.

In step S709, when the job execution request issued in step S708 is unsuccessful (NO in step S709), the processing proceeds to step S706. In step S706, the UI control unit 402 displays an error screen on the display 214. Then, the processing exits the flowchart. For example, when the image forming apparatus 104 that has received a job attempts the local authentication by using the user information included in the job and then fails the authentication and login processing is not performed, the job execution request is determined as being unsuccessful. On the other hand, when the job execution request is successful (YES in step S709), the processing proceeds to step S710.

In step S710, the job control unit 407 determines whether an instruction for displaying a screen for prompting document placement is received from the image forming apparatus 104 based on the job transmission in step S708. When the display instruction is received (YES in step S710), the processing proceeds to step S711. On the other hand, when the display instruction is not received (NO in step S710), the processing proceeds to step S713.

In step S711, the UI control unit 402 displays the screen for prompting document placement on the display 214.

An example of the screen for prompting document placement is illustrated in FIG. 8C. A message area 821 includes a message that prompts the user to place a document, a Cancel button 822, and a Document Placed button 823. Pressing the Cancel button 822 cancels the job execution request.

Pressing the Document Placed button 823 enables the processing to proceed to the next step. In step S712, the UI control unit 402 determines whether the Document Placed button 823 is pressed on the screen for prompting document placement. When the UI control unit 402 determines that the Document Placed button 823 is pressed (YES in step S712), the processing returns to step S710. On the other hand, when the UI control unit 402 determines that the Document Placed button 823 is not pressed, i.e., the Cancel button 822 is pressed (NO in step S712), the processing exits the flowchart.

In step S713, the job control unit 407 determines whether an authentication code request for the job transmitted in step S708 is received from the image forming apparatus 104. When the authentication code request is received (YES in step S713), the processing proceeds to step S714. On the other hand, when the authentication code request is not received (NO in step S713), the processing exits the flowchart.

In step S714, the UI control unit 402 displays an authentication code input screen and then receives an input of the authentication code from the user. An example of the authentication code input screen is illustrated in FIG. 8D. A message area 831 includes an input field for inputting the authentication code, a Cancel button 832, and an OK button 833. In the present exemplary embodiment, when the user inputs the authentication code displayed on the display/operation unit 307 of the image forming apparatus 104 in the input field of the message area 831 and then presses the OK button 833, the authentication code is transmitted. Pressing the Cancel button 832 cancels the job execution request. It is also possible that the image forming apparatus 104 displays a QR Code instead of the authentication code, and the user reads the QR Code with a camera 216 of the data processing apparatus 101 and then transmits the acquired authentication code. When the image forming apparatus 104 displays the QR Code, the data processing apparatus 101 may automatically activate the camera 216.

In step S715, the device connection unit 404 transmits the authentication code received in step S714 to the image forming apparatus 104. In this case, the device connection unit 404 may transmit the authentication code upon a press on the OK button 833 on the screen illustrated in FIG. 8D, or automatically transmit the authentication code upon reception of inputs of a code with the predetermined number of digits. When the user reads a QR Code, the device connection unit 404 transmits the information extracted from the acquired QR Code.

In step S716, the job control unit 407 determines whether the authentication with the authentication code transmitted in step S715 is successful. More specifically, the job control unit 407 performs the determination based on a response to the authentication code transmission in step S715 from the image forming apparatus 104. When the authentication is successful (YES in step S716), the processing exits the flowchart. On the other hand, when the authentication is unsuccessful (NO in step S716), the processing proceeds to step S706. In step S706, the job control unit 407 displays an error screen, or the processing returns to step S714. By the above-described processing of the flowchart, the data processing apparatus 101 cannot instruct the image forming apparatus 104 to execute the job unless the user inputs the authentication code displayed on the display/operation unit 307 of the image forming apparatus 104 and then transmits the authentication code to the image forming apparatus 104. This enables preventing wrong job execution due to user misoperation and improper job execution.

Figure 9:
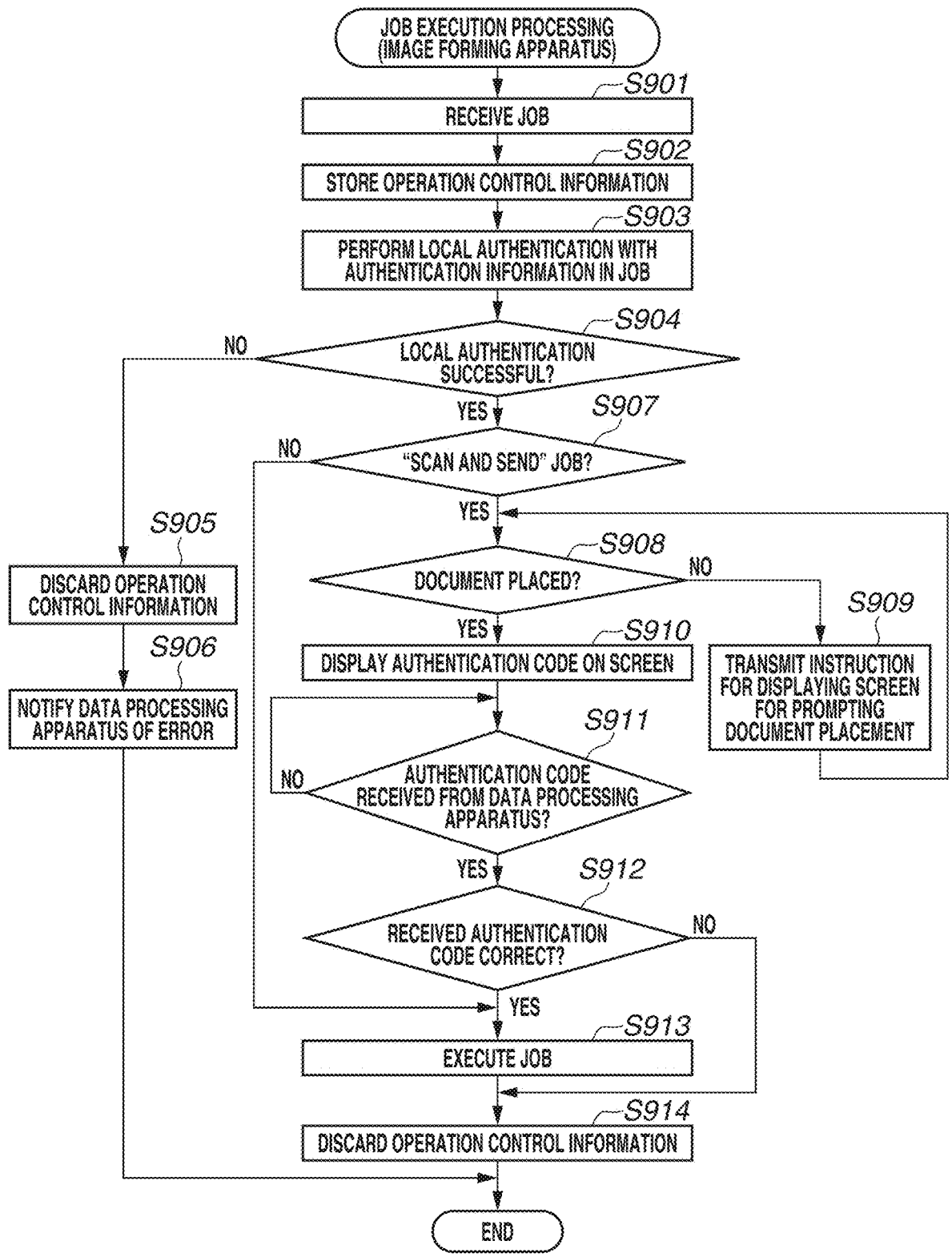
FIG. 9 is a flowchart illustrating job execution processing of the image forming apparatus according to the first exemplary embodiment.

The job execution processing of the image forming apparatus 104 according to the present exemplary embodiment will be described below with reference to FIGS. 9, 10A, and 10B. FIG. 9 is a flowchart illustrating the job execution processing. The flowchart is implemented by the CPU 302 of the image forming apparatus 104 loading a program for implementing each control module stored in the ROM 304 or the HDD 305 into the RAM 303 and then executing the program. The following flowchart is started when the image forming apparatus 104 receives the job transmitted in step S708 in FIG. 7.

Figure 10A:
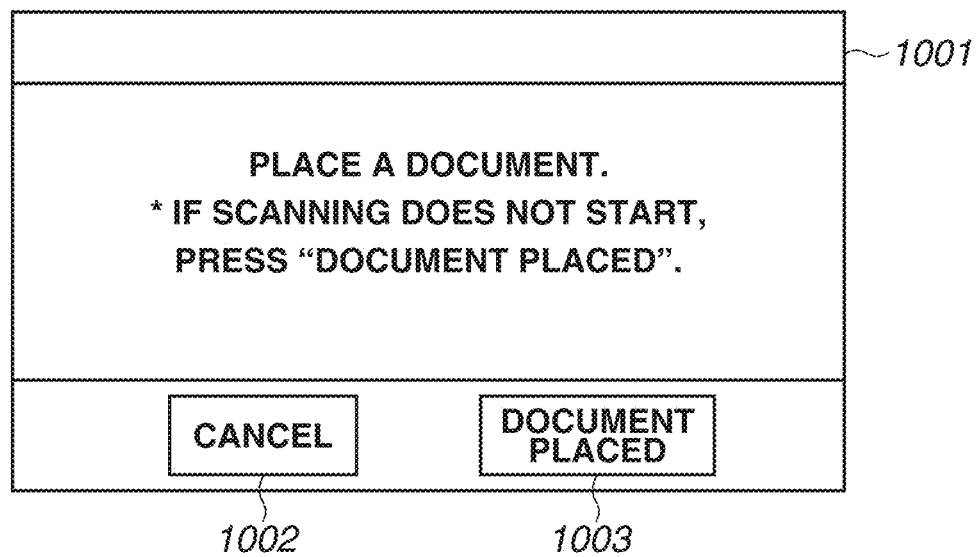
FIGS. 10A and 10B illustrate examples of screens displayed by the image forming apparatus.
Figure 10B:
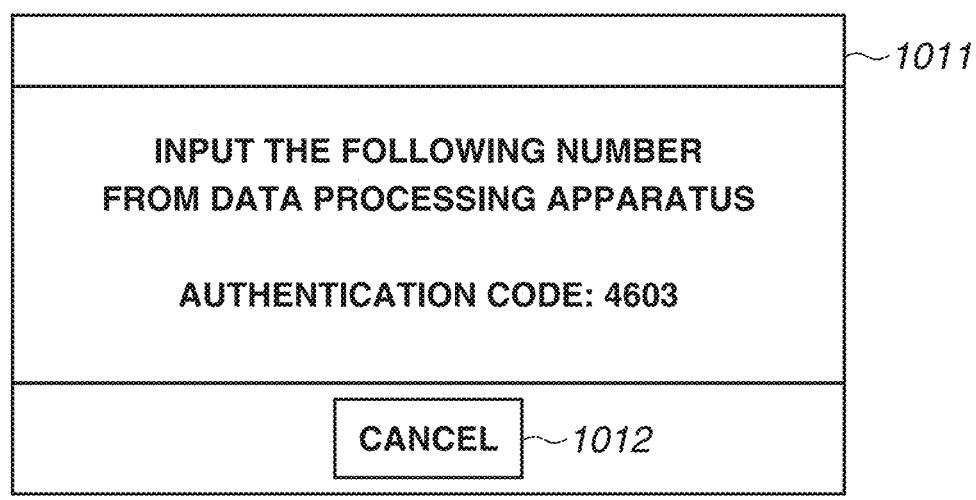

FIGS. 10A and 10B illustrate examples of screens displayed by the system software 501 of the image forming apparatus 104.

In step S901, the network control unit 505 receives a job transmitted from the data processing apparatus 101 via the network 103 and receives a job execution request. The job received in this step is, for example, the job transmitted in step S708.

In step S902, the authentication control unit 503 extracts operation control information included in the received job and then stores the operation control information in the RAM 303. At this timing, the network control unit 505 may already have received another job execution request (not illustrated). In a case where the operation control information is included in the job, the network control unit 505 may not receive the job execution request, and may notify the data processing apparatus 101 of error information and terminate the processing.

In step S903, the authentication control unit 503 performs the local authentication by using the user information included in the job. When the local authentication is successful, the user corresponding to the user information included in the job is logged in to the image forming apparatus 104. The login operation is intended to occupy the operation panel of the image forming apparatus 104.

In step S904, the authentication control unit 503 determines whether the local authentication is successful. When the local authentication is successful (YES in step S904), the authentication control unit 503 performs the login processing. Then, the processing proceeds to step S907. On the other hand, when the local authentication is unsuccessful (NO in step S904), the processing proceeds to step S905. In step S905, the authentication control unit 503 discards the operation control information stored in step S902. In step S906, the authentication control unit 503 transmits error information to the data processing apparatus 101 via the network control unit 505. Then, the processing exits this flowchart.

In step S907, the job control unit 507 determines whether the job received in step S901 is a "Scan and Send" job. When the received job is determined to be a "Scan and Send" job (YES in step S907), the processing proceeds to step S908. On the other hand, when the received job is determined to be not a "Scan and Send" job (NO in step S907), the processing proceeds to step S913.

In step S908, the job control unit 507 determines whether a scan document is placed on the scanner 313. When placement of a scan document cannot be detected (NO in step S908), the processing proceeds to step S909. In step S909, the UI control unit 502 displays the screen for prompting document placement on the display/operation unit 307, and the network control unit 505 transmits an instruction for displaying the screen for prompting document placement to the data processing apparatus 101. A screen 1001 illustrated in FIG. 10A is an example of the screen for prompting document placement. The screen 1001 includes a message for prompting document placement, a Cancel button 1002, and a Document Placed button 1003. Pressing the Cancel button 1002 cancels the job execution request. The Document Placed button 1003 is used, when a scan document placed on the image forming apparatus 104 by the user is not automatically detected, to notify the image forming apparatus 104 that the document has been placed. Pressing the Document Placed button 1003 enables the processing to proceed to the next step. While, in the above-described example, the screen for prompting document placement is displayed on both the display/operation unit 307 of the image forming apparatus 104 and the data processing apparatus 101, the screen may be displayed only on either one of the apparatuses.

When the placement of a scan document is detected (YES in step S908), the processing proceeds to step S910. In step S910, the job control unit 507 generates an authentication code, and the UI control unit 502 displays a screen displaying information corresponding to the generated authentication code on the display/operation unit 307. A screen 1011 illustrated in FIG. 10B is an example of the screen displaying information corresponding to the generated authentication code. The screen 1011 includes a message displaying an authentication code, and a Cancel button 1012. Pressing the Cancel button 1012 cancels the job execution request. While, in the example in FIG. 10B, the authentication code is displayed as a numerical value, the authentication code may also be displayed as a character string or information corresponding to the authentication code may be displayed in QR Code format. In the latter case, the generated authentication code is encrypted into a QR Code and displayed.

In step S911, the job control unit 507 determines whether an authentication code is received from the data processing apparatus 101 via the network 103. When an authentication code is received (YES in step S911), the processing proceeds to step S912. On the other hand, when an authentication code is not received (NO in step S911), the processing repeats step S911. In step S912, the job control unit 507 determines whether the authentication code received in step S911 is correct. More specifically, when the authentication code received from the data processing apparatus 101 matches the authentication code displayed on the display/operation unit 307, the job control unit 507 determines that the received authentication code is correct. At this timing, it is determined as an error if the authentication code displayed on the display/operation unit 307 is received from an apparatus other than the data processing apparatus 101.

In step S912, when the received authentication code is correct (YES in step S912), the processing proceeds to step S913. On the other hand, when the received authentication code is not correct (NO in step S912), the image forming apparatus 104 notifies the data processing apparatus 101 of an error. Then, the processing proceeds to step S914. In this case, the processing may return to step S911 or proceed to step S905.

In step S913, the job control unit 507 executes the job based on the job setting information acquired in step S901. In the present exemplary embodiment, the job setting information includes scan settings for scanning a document and a destination address for transmitting a scanned image by e-mail. The job control unit 507 scans a document based on the information and then sends an e-mail to the specified destination address. When the job execution is completed, the job control unit 507 may notify the data processing apparatus 101 of information indicating completion of the job execution. While the present exemplary embodiment has been described above as being implemented using the e-mail transmission function, the e-mail transmission function is merely an example, and the present exemplary embodiment may be implemented using the copy and fax functions.

In step S914, the authentication control unit 503 discards the operation control information stored in step S902. Then, the processing exits the flowchart.

By the processing of the above-described flowchart, the image forming apparatus 104 executes a "Scan and Send" job only when correct authentication information is received from the data processing apparatus 101, preventing wrong job execution (due to user misoperation) and improper job execution. The above-described flowchart is based on an example where the image forming apparatus 104 requests the data processing apparatus 101 for the authentication code when a "Scan and Send" job is executed. However, a job for which the authentication code is requested is not limited to the "Scan and Send" job but may be other jobs such as a print job and a copy job. When the job is a job other than the "Scan and Send" job (NO in step S907), the image forming apparatus 104 does not prompt the user to input an authentication code. This is because there is no possibility that a document is improperly transmitted in a print job and a copy job.

In the present exemplary embodiment, when the data processing apparatus 101 transmits a job execution instruction to the image forming apparatus 104 to issue a job execution request, the image forming apparatus 104 displays an authentication code, and the data processing apparatus 101 inputs and transmits the authentication code to execute the job. In this case, the job is executed only when the authentication code transmitted by the data processing apparatus 101 satisfies a predetermined condition. This enables a user to complete operation only with the data processing apparatus 101 while preventing wrong job execution (due to user misoperation) and improper job execution, thus improving user operability. This also enables a user who wants to avoid operating an apparatus shared by a plurality of users, such as the image forming apparatus 104, to execute the processing by operating only the data processing apparatus 101 of the user, thus improving usability.

The first exemplary embodiment has been described above with regard to a method where, when the data processing apparatus 101 issues a job execution request to the image forming apparatus 104, the image forming apparatus 104 automatically performs the local authentication by using the user information included in the job, displays an authentication code, receives the authentication code from the data processing apparatus 101, and then executes the job. In the method, an authentication code needs to be displayed each time a job is executed. A second exemplary embodiment will be described below with regard to an example where a user is not prompted to input an authentication code if the user has already logged in to the image forming apparatus 104 before the user transmits a job from the data processing apparatus 101. A basic configuration of the second exemplary embodiment is the same as that of the first exemplary embodiment, and only differences from the first exemplary embodiment will be described below.

Figure 11B:
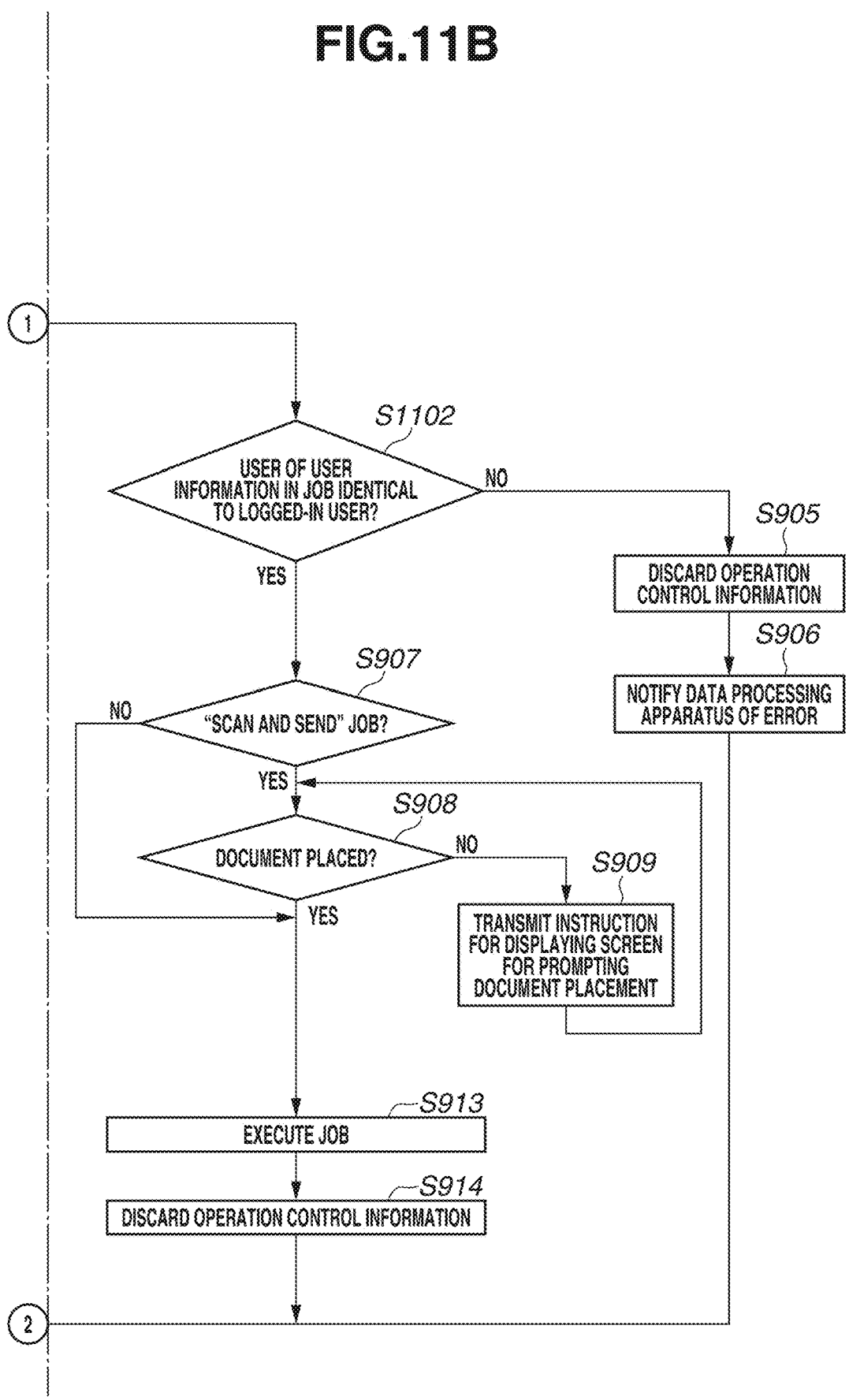

FIG. 11, which includes FIGS. 11A and 11B, is a flowchart illustrating the job execution processing performed by the image forming apparatus 104 according to the second exemplary embodiment. The basic processing is the same as that in FIG. 9, and only differences from the processing in FIG. 9 will be described below.

In step S1101, the authentication control unit 503 determines whether the user is a logged-in user of the image forming apparatus 104. When the user is not a logged-in user (NO in step S1101), the processing proceeds to step S903. On the other hand, when the user is a logged-in user (YES in step S1101), the processing proceeds to step S1102.

In step S1102, the authentication control unit 503 determines whether a user indicated by the user information extracted from the job is identical to the logged-in user. When the authentication control unit 503 determines that the user indicated by the user information is identical to the logged-in user (YES in step S1102), the processing proceeds to step S907. On the other hand, when the authentication control unit 503 determines that the user indicated by the user information is not identical to the logged-in user (NO in step S1102), the processing proceeds to step S905. In a case where the processing proceeds to step S907, the image forming apparatus 104 does not display an authentication code on the screen and executes the job in step S913. More specifically, if the user who has transmitted the job is identical to the logged-in user, the user is not prompted to input a code for the job execution. If the user who has issued a job execution instruction on the data processing apparatus 101 is identical to the user having already logged in to the image forming apparatus 104, the image forming apparatus 104 does not prompt the user to input an authentication code for the job execution, making it unnecessary for the user to perform a code input operation.

A third exemplary embodiment will be described below with regard to an example where an authentication code is not displayed in a case where the display of the image forming apparatus 104 is being remotely controlled by another apparatus when a job is received from the data processing apparatus 101. If the authentication code is displayed in the case where the operation panel of the image forming apparatus 104 is being remotely controlled, the authentication code may possibly be acquired in an improper way. The third exemplary embodiment will be described below with regard to a method for selecting whether to display the authentication code depending on whether the operation panel of the image forming apparatus 104 is being remotely controlled. The basic configuration of the third exemplary embodiment is the same as that of the first exemplary embodiment, and only differences from the first exemplary embodiment will be described below.

Figure 12:
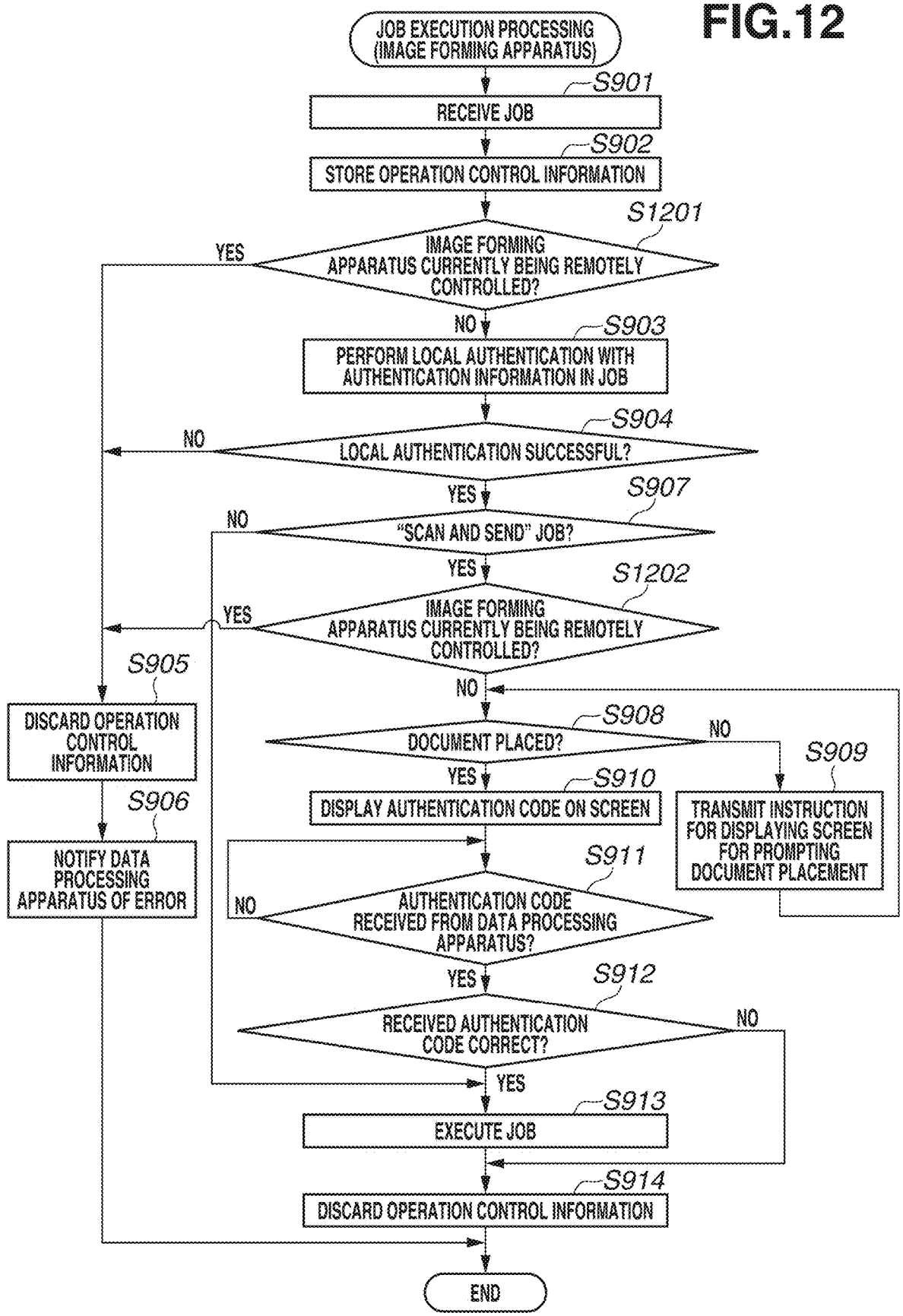
FIG. 12 is a flowchart illustrating job execution processing of an image forming apparatus according to a third exemplary embodiment.

Processing according to the third exemplary embodiment will be described below with reference to FIG. 12. The basic configuration of the flowchart in FIG. 12 is the same as that of the flowchart in FIG. 9, and only differences will be described below.

In step S907, when the received job is determined to be a "Scan and Send" job by the job control unit 507 (YES in step S907), the processing proceeds to step S1202 instead of step S908. In step S1202, the network control unit 505 determines whether the display/operation unit 307 of the image forming apparatus 104 is being remotely controlled by another apparatus.

A state of being remotely controlled refers to a state where the operation panel of the image forming apparatus 104 is being remotely controlled by an external apparatus by using, for example, Virtual Network Computing (VNC) using the Remote Framebuffer (RFB) protocol. When the image forming apparatus 104 is not being remotely controlled (NO in step S1202), the processing proceeds to step S908. On the other hand, when the image forming apparatus 104 is being remotely controlled (YES in step S1202), the processing proceeds to steps S905 and S906. In step S906, the image forming apparatus 104 notifies the data processing apparatus 101 of an error.

While, in this case, the network control unit 505 determines whether the display/operation unit 307 of the image forming apparatus 104 is being remotely controlled by another apparatus after step S907, the present invention is not limited thereto. For example, in step S1201 subsequent to step S902 illustrated in FIG. 12, the network control unit 505 determines whether the display/operation unit 307 of the image forming apparatus 104 is being remotely controlled by another apparatus. When the display/operation unit 307 is being remotely controlled (YES in step S1201), the processing proceeds to step S905. On the other hand, when the display/operation unit 307 is not being remotely controlled (NO in step S1201), the processing proceeds to step S903. The above-described example flowchart in FIG. 12 includes two steps in which the network control unit 505 determines whether the display/operation unit 307 of the image forming apparatus 104 is being remotely controlled by another apparatus. However, the flowchart may include only either one of the steps.

In the above-described processing, when the operation panel of the image forming apparatus 104 is being remotely controlled, the image forming apparatus 104 neither displays an authentication code on the operation panel nor executes the job upon reception of a "Scan and Send" job from the data processing apparatus 101, thus ensuring security.

In the first exemplary embodiment, when the data processing apparatus 101 issue a job execution request to the image forming apparatus 104, the image forming apparatus 104 automatically performs the login processing by using the user information included in the job, determines whether document placement is completed, and then displays an authentication code. The method has an issue that, since the user is prompted to place a document and input an authentication code after the login processing, the user occupies the operation panel of the image forming apparatus 104 for a prolonged period of time after a login. For this reason, a fourth exemplary embodiment will be described below with regard to a method in which the image forming apparatus 104 receives a job, determines whether document placement is completed, displays an authentication code, and then performs the login processing. The basic configuration of the fourth exemplary embodiment is the same as that of the first exemplary embodiment, and only differences from the first exemplary embodiment will be described below.

Figure 13:
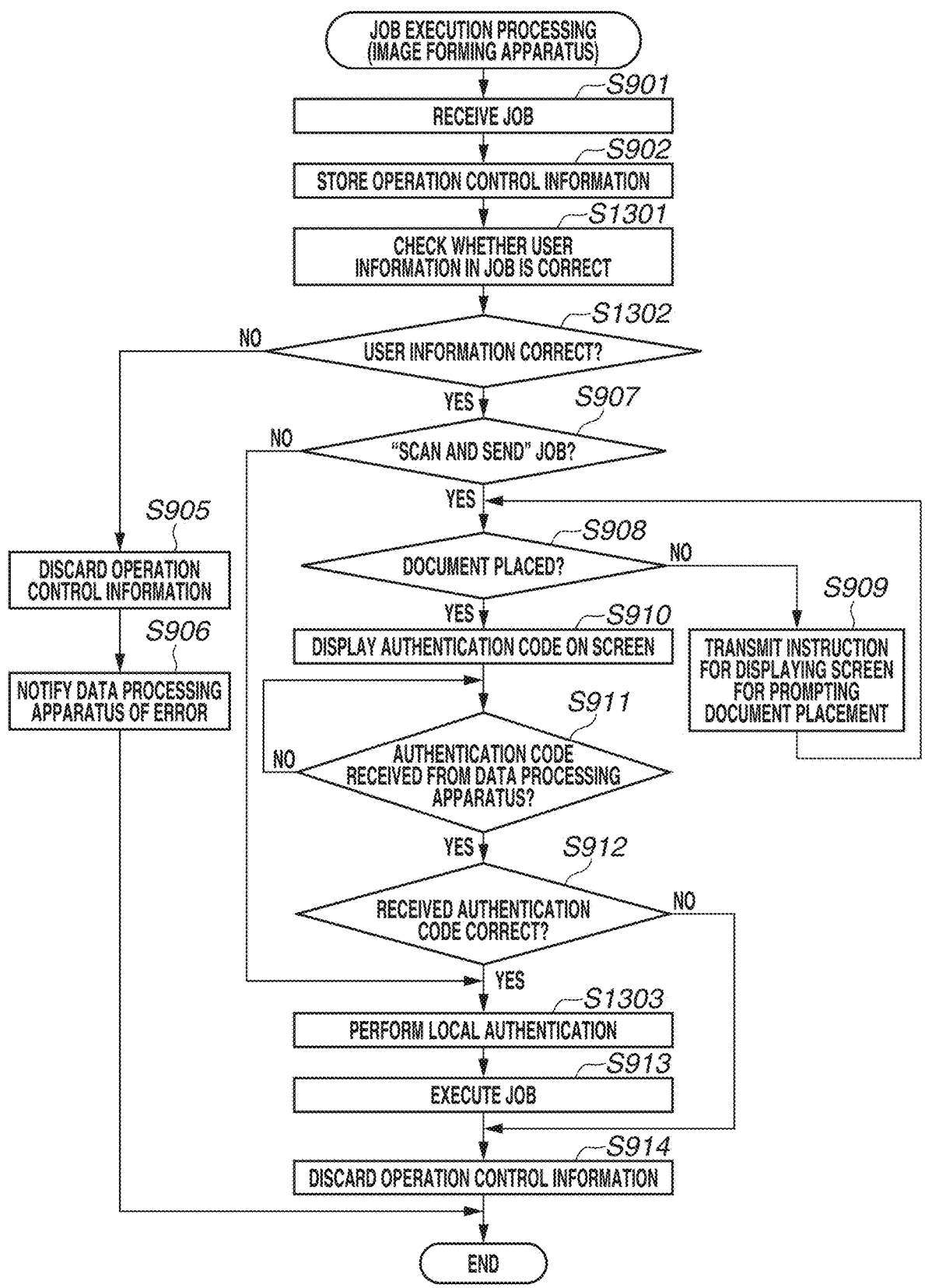
FIG. 13 is a flowchart illustrating job execution processing of an image forming apparatus according to a fourth exemplary embodiment.

FIG. 13 is a flowchart illustrating the job execution processing performed by the image forming apparatus 104 according to the fourth exemplary embodiment. The basic processing is the same as that in FIG. 9, and only differences from the processing in FIG. 9 will be described below.

In step S1301, the authentication control unit 503 acquires the user information included in the received job and then determines whether the acquired user information matches information in the user information managed by the image forming apparatus 104, and is correct.

In step S1302, the authentication control unit 503 determines whether the received user information matches the user information managed by the image forming apparatus 104. When the received user information matches the user information managed by the image forming apparatus 104 (YES in step S1302), the processing proceeds to step S907. On the other hand, when the received user information does not match the user information managed by the image forming apparatus 104, i.e., when in the case of authentication information failure (NO in step S1302), the processing proceeds to step S905.

In step S1303, the authentication control unit 503 performs the local authentication by using the user information acquired in step S1301 to execute the local login processing of the user. In this case, the authentication control unit 503 determines whether the received authentication code is correct in step S912. Only when the authentication code is correct, the authentication control unit 503 performs the local login processing. Since the user information has already been checked in step S1301, there is basically no possibility of local authentication failure in this step.

As described above, when the data processing apparatus 101 issues a job execution request to the image forming apparatus 104, the image forming apparatus 104 determines whether document placement is completed and checks the authentication code before performing the login processing. This processing enables minimizing the time period during which the user occupies the operation panel of the image forming apparatus 104 for the login processing. The image forming apparatus 104 also determines whether the user information is correct in step S1301 before determining whether the document placement is completed and checking the authentication code. This enables preventing the user who is not capable of executing the job from inputting an authentication code.

The fourth exemplary embodiment has been described above as a modification of the first exemplary embodiment. In the modification, the image forming apparatus 104 determines whether the document placement is completed and displays an authentication code before performing the login processing. The configuration is also applicable to the second and third exemplary embodiments.

The exemplary embodiments of the present invention can also be implemented by performing the following processing. More specifically, software (program) for implementing the functions of the above-described exemplary embodiments is supplied to a system or an apparatus via a network or various types of storage media, and a computer (or a CPU or a micro processing unit (MPU)) of the system or the apparatus reads the program and executes the program. In this case, the computer program and the storage medium storing the program are included in the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2021-045908, filed Mar. 19, 2021, and No. 2021-160996, filed Sep. 30, 2021, which are hereby incorporated by reference herein in their entirety.

What is claimed is:

1. A method performed by a data processing apparatus and an image forming apparatus, the method comprising:
  transmitting, by the data processing apparatus, an execution instruction for a job to the image forming apparatus;
  generating, by the image forming apparatus, an authentication code corresponding to the transmitted execution instruction and displaying the authentication code or information representing an encrypted authentication code on a display unit of the image forming apparatus;
  transmitting, by the data processing apparatus, an authentication code to the image forming apparatus; and
  executing, by the image forming apparatus, a job corresponding to the transmitted execution instruction in a case where a predetermined condition is determined to be satisfied based on the transmitted authentication code and the generated authentication code,
  wherein, in a case where the transmitted execution instruction is an instruction for executing a first type job for transmitting an image generated by scanning, the image forming apparatus displays the authentication code or the information representing the encrypted authentication code, and
  wherein, in a case where the execution instruction is an instruction for executing a second type job different from the first type job, the image forming apparatus displays neither the authentication code nor the information representing the encrypted authentication code.

2. The method according to claim 1, wherein, when the transmitted authentication code matches the generated authentication code, the predetermined condition is determined to be satisfied.

3. The method according to claim 1,
wherein the transmitted execution instruction includes user information on a user of the data processing apparatus, and
wherein the image forming apparatus having received the user information performs login processing by using the user information.

4. The method according to claim 1, wherein the displayed authentication code is displayed as a numerical value.

5. The method according to claim 1, wherein the displayed information representing the encrypted authentication code is displayed in QR Code format.

6. The method according to claim 1,
wherein the execution instruction is an instruction for executing a job using a scanner function, and
wherein, in a case where no document is placed on a scanner of the image forming apparatus upon reception of the transmitted execution instruction, a screen indicating an error is displayed by the image forming apparatus.

7. A method performed by a data processing apparatus and an image forming apparatus, the method comprising:
transmitting, by the data processing apparatus, an execution instruction for a job to the image forming apparatus;
generating, by the image forming apparatus, an authentication code corresponding to the transmitted execution instruction and displaying the authentication code or information representing an encrypted authentication code on a display unit of the image forming apparatus;
transmitting, by the data processing apparatus, an authentication code to the image forming apparatus; and
executing, by the image forming apparatus, a job corresponding to the transmitted execution instruction in a case where a predetermined condition is determined to be satisfied based on the transmitted authentication code and the generated authentication code,
wherein, in a case where a document is placed on a scanner upon reception of the transmitted execution instruction by the image forming apparatus, the image forming apparatus displays the authentication code or the information representing the encrypted authentication code.

8. A method performed by a data processing apparatus and an image forming apparatus, the method comprising:
transmitting, by the data processing apparatus, an execution instruction for a job to the image forming apparatus;
generating, by the image forming apparatus, an authentication code corresponding to the transmitted execution instruction and displaying the authentication code or information representing an encrypted authentication code on a display unit of the image forming apparatus;
transmitting, by the data processing apparatus, an authentication code to the image forming apparatus; and
executing, by the image forming apparatus, a job corresponding to the transmitted execution instruction in a case where a predetermined condition is determined to be satisfied based on the transmitted authentication code and the generated authentication code,
wherein, in a case where no document is placed on a scanner upon reception of the transmitted execution instruction by the image forming apparatus, the image forming apparatus displays neither the authentication code nor the information representing the encrypted authentication code.

9. A method performed by a data processing apparatus and an image forming apparatus, the method comprising:
transmitting, by the data processing apparatus, an execution instruction for a job to the image forming apparatus;
generating, by the image forming apparatus, an authentication code corresponding to the transmitted execution instruction and displaying the authentication code or information representing an encrypted authentication code on a display unit of the image forming apparatus;
transmitting, by the data processing apparatus, an authentication code to the image forming apparatus; and
executing, by the image forming apparatus, a job corresponding to the transmitted execution instruction in a case where a predetermined condition is determined to be satisfied based on the transmitted authentication code and the generated authentication code,
wherein, in a case where a user of the data processing apparatus has logged in to the image forming apparatus upon reception of the transmitted execution instruction by the image forming apparatus, the image forming apparatus does not display an authentication code on the display unit of the image forming apparatus.

10. A method performed by a data processing apparatus and an image forming apparatus, the method comprising:
transmitting, by the data processing apparatus, an execution instruction for a job to the image forming apparatus;
generating, by the image forming apparatus, an authentication code corresponding to the transmitted execution instruction and displaying the authentication code or information representing an encrypted authentication code on a display unit of the image forming apparatus;
transmitting, by the data processing apparatus, an authentication code to the image forming apparatus; and
executing, by the image forming apparatus, a job corresponding to the transmitted execution instruction in a case where a predetermined condition is determined to be satisfied based on the transmitted authentication code and the generated authentication code,
wherein, in a case where the display unit of the image forming apparatus is being remotely controlled upon reception of the transmitted execution instruction, the image forming apparatus does not execute the job corresponding to the transmitted execution instruction.

11. A system comprising:
a data processing apparatus; and
an image forming apparatus,
the data processing apparatus comprising:
a memory; and
at least one processor in communication with the memory, wherein the at least one processor performs:
transmitting an execution instruction for a job to the image forming apparatus; and
transmitting an authentication code to the image forming apparatus,
the image forming apparatus comprising:
a memory; and
at least one processor in communication with the memory, wherein the at least one processor performs:
generating an authentication code corresponding to the transmitted execution instruction and displaying the authentication code or information representing an encrypted authentication code on a display unit of the image forming apparatus; and executing a job corresponding to the transmitted execution instruction in a case where a predetermined condition is determined to be satisfied based on the transmitted authentication code and the generated authentication code, wherein, in a case where the transmitted execution instruction is an instruction for executing a first type job for transmitting an image generated by scanning, the image forming apparatus displays the authentication code or the information representing the encrypted authentication code, and wherein, in a case where the execution instruction is an instruction for executing a second type job different from the first type job, the image forming apparatus displays neither the authentication code nor the information representing the encrypted authentication code.

12. An image forming apparatus that communicates with a data processing apparatus, the image forming apparatus comprising:

a memory; and at least one processor in communication with the memory, wherein the at least one processor performs:

receiving an execution instruction for a job from the data processing apparatus;

generating an authentication code corresponding to the received execution instruction and displaying the authentication code or information representing an encrypted authentication code on a display unit of the image forming apparatus; and executing a job corresponding to the transmitted execution instruction in a case where a predetermined condition is determined to be satisfied based on the authentication code transmitted from the data processing apparatus and the generated authentication code, wherein, in a case where the transmitted execution instruction is an instruction for executing a first type job for transmitting an image generated by scanning, the image forming apparatus displays the authentication code or the information representing the encrypted authentication code, and wherein, in a case where the execution instruction is an instruction for executing a second type job different from the first type job, the image forming apparatus displays neither the authentication code nor the information representing the encrypted authentication code.

13. The image forming apparatus according to claim 12, wherein, when the transmitted authentication code matches the generated authentication code, the predetermined condition is determined to be satisfied.

14. The image forming apparatus according to claim 12, wherein the transmitted execution instruction includes user information on a user of the data processing apparatus, and wherein the image forming apparatus having received the user information performs login processing by using the user information.

15. The image forming apparatus according to claim 12, wherein the displayed authentication code is displayed as a numerical value.

16. The image forming apparatus according to claim 12, wherein the displayed information representing the encrypted authentication code is displayed in QR Code format.

17. The image forming apparatus according to claim 12, wherein, when no document is placed on a scanner of the image forming apparatus upon reception of the transmitted execution instruction, the image forming apparatus displays a screen indicating an error.

18. An image forming apparatus that communicates with a data processing apparatus, the image forming apparatus comprising:

a memory; and at least one processor in communication with the memory, wherein the at least one processor performs:

receiving an execution instruction for a job from the data processing apparatus;

generating an authentication code corresponding to the received execution instruction and displaying the authentication code or information representing an encrypted authentication code on a display unit of the image forming apparatus; and executing a job corresponding to the transmitted execution instruction in a case where a predetermined condition is determined to be satisfied based on the authentication code transmitted from the data processing apparatus and the generated authentication code, wherein, when a document is placed on a scanner upon reception of the transmitted execution instruction, the image forming apparatus displays the authentication code or the information representing the encrypted authentication code.

* * * * *